(12) United States Patent
White et al.

(10) Patent No.: US 10,207,625 B2
(45) Date of Patent: Feb. 19, 2019

(54) PIPE DEPLOYMENT TRAILER

(71) Applicant: Trinity Bay Equipment Holdings, LLC, Houston, TX (US)

(72) Inventors: Christopher White, Houston, TX (US); Kyle Helbing, Houston, TX (US); Alexander Lee Winn, Houston, TX (US)

(73) Assignee: TRINITY BAY EQUIPMENT HOLDINGS, LLC, Houston, TX (US)

(*) Notice: Subject to any disclaimer, the term of this patent is extended or adjusted under 35 U.S.C. 154(b) by 0 days.

(21) Appl. No.: 15/799,615

(22) Filed: Oct. 31, 2017

(65) Prior Publication Data

US 2018/0050625 A1 Feb. 22, 2018

Related U.S. Application Data

(60) Division of application No. 15/445,519, filed on Feb. 28, 2017, which is a continuation of application No. PCT/US2016/026673, filed on Apr. 8, 2016.

(51) Int. Cl.
*B60P 1/16* (2006.01)
*B60P 1/28* (2006.01)
(Continued)

(52) U.S. Cl.
CPC ............ *B60P 3/035* (2013.01); *B60P 1/16* (2013.01); *B60P 1/28* (2013.01); *E21B 19/008* (2013.01); *E21B 19/146* (2013.01)

(58) Field of Classification Search
CPC ....... B65H 75/40; B65H 75/403; B60P 3/035; B60P 1/16
See application file for complete search history.

(56) References Cited

U.S. PATENT DOCUMENTS

| 438,015 A | * 10/1890 | Lyon ................ B65H 54/585 |
| | | 242/532.6 |
| 2,622,918 A | 12/1952 | Staffe |

(Continued)

FOREIGN PATENT DOCUMENTS

| CN | 2338581 | 9/1999 |
| EP | 877192 | 11/1998 |

(Continued)

OTHER PUBLICATIONS

Office Action issued in corresponding Mexican Application No. MX/a/2010/013584 with English language reporting thereof dated Jul. 8, 2014.

(Continued)

*Primary Examiner* — William A. Rivera
(74) *Attorney, Agent, or Firm* — Greenberg Traurig, LLP; Dwayne L. Mason; Mark G. Chretien

(57) ABSTRACT

A trailer is provided having a trailer base and a trailer bed mounted to the trailer base. The trailer includes at least one actuator coupled to the trailer bed and the trailer base that raises and lowers the trailer bed. When the at least one actuator is extended, the trailer bed is raised to a vertical orientation. When the at least one actuator is retracted, the trailer bed is in the horizontal orientation. The trailer includes a lifting head protruding outwardly from the trailer bed. The position of the lifting head is adjustable along a longitudinal axis of the trailer bed.

7 Claims, 17 Drawing Sheets

(51) Int. Cl.
*B60P 3/035* (2006.01)
*E21B 19/00* (2006.01)
*E21B 19/14* (2006.01)

(56) References Cited

U.S. PATENT DOCUMENTS

| | | | |
|---|---|---|---|
| 2,677,476 A * | 5/1954 | Bebinger | B60P 3/035 |
| | | | 242/557 |
| 2,941,678 A | 6/1960 | Keys | |
| 3,044,647 A | 7/1962 | Hopfeld | |
| 3,088,769 A | 5/1963 | Richardson | |
| 3,184,082 A | 5/1965 | Hall | |
| 3,409,156 A | 11/1968 | Mills | |
| 3,504,866 A | 4/1970 | Palynchuk | |
| 3,574,355 A | 4/1971 | Oetiker | |
| 3,627,224 A | 12/1971 | Diggs | |
| 3,690,492 A | 9/1972 | Shore | |
| 3,702,707 A | 11/1972 | Rosan, Sr. | |
| 3,724,888 A | 4/1973 | Dehar | |
| 3,736,633 A | 6/1973 | Kalen | |
| 4,023,690 A | 5/1977 | Goode | |
| 4,128,179 A | 12/1978 | Gilbert | |
| 4,526,500 A | 7/1985 | Patrick | |
| 4,569,540 A | 2/1986 | Beson | |
| 4,621,972 A | 11/1986 | Grotte | |
| 4,854,613 A | 8/1989 | Reece | |
| 4,929,145 A | 5/1990 | Thompson | |
| 5,072,072 A | 12/1991 | Bawa | |
| 5,215,336 A | 6/1993 | Worthing | |
| 5,236,087 A | 8/1993 | Morgan | |
| 5,330,235 A | 7/1994 | Wagner et al. | |
| 5,383,714 A | 1/1995 | Hunter | |
| 5,391,043 A | 2/1995 | Bohata | |
| 5,547,231 A | 8/1996 | Sharp | |
| 5,816,764 A | 10/1998 | Bohata | |
| 5,861,204 A | 1/1999 | O'Sullivan | |
| 6,139,617 A | 10/2000 | Halko et al. | |
| 6,171,047 B1 | 1/2001 | Vandervalk | |
| 6,227,791 B1 | 5/2001 | Jarvinen | |
| 6,374,863 B1 | 4/2002 | Friederich | |
| 6,394,504 B1 | 5/2002 | Brummans et al. | |
| 6,575,500 B1 | 6/2003 | Wili | |
| 6,705,351 B2 | 3/2004 | Fraser et al. | |
| 6,737,584 B2 | 5/2004 | Kiely | |
| 6,827,375 B2 | 12/2004 | Fraser | |
| 6,889,715 B2 | 5/2005 | Fraser et al. | |
| 6,899,140 B2 | 5/2005 | Fraser et al. | |
| 7,007,983 B2 | 3/2006 | Arosio | |
| 7,028,781 B2 * | 4/2006 | Hill | B65H 75/425 |
| | | | 166/384 |
| 7,029,226 B2 | 4/2006 | Walsh | |
| 7,055,551 B2 | 6/2006 | Fraser et al. | |
| 7,448,570 B2 * | 11/2008 | Bohnisch | B65H 49/30 |
| | | | 242/557 |
| 7,614,581 B2 * | 11/2009 | Beem | E04H 17/266 |
| | | | 242/403 |
| 8,297,904 B1 | 10/2012 | Schroeder | |
| 8,308,413 B2 * | 11/2012 | Ford | A01G 20/10 |
| | | | 414/24.6 |
| 8,505,845 B2 * | 8/2013 | Zink | B65H 75/403 |
| | | | 242/390.3 |
| 8,869,580 B2 | 10/2014 | Basler | |
| 2003/0006392 A1 | 1/2003 | Arosio | |
| 2003/0108391 A1 | 6/2003 | Essay | |
| 2007/0170301 A1 * | 7/2007 | Morello | B65H 16/08 |
| | | | 242/557 |
| 2011/0072874 A1 * | 3/2011 | Basler | B21C 47/04 |
| | | | 72/183 |
| 2013/0320172 A1 | 12/2013 | Skorupa | |
| 2015/0166286 A1 * | 6/2015 | Morris | B09B 3/00 |
| | | | 242/533.8 |
| 2017/0197536 A1 * | 7/2017 | Mayer | B60P 3/035 |
| 2017/0292337 A1 | 10/2017 | White | |

FOREIGN PATENT DOCUMENTS

| | | |
|---|---|---|
| EP | 1731823 | 12/2006 |
| EP | 1899721 | 3/2008 |
| GB | 866852 | 5/1961 |
| JP | 1991-99294 | 4/1991 |
| JP | H10148280 | 6/1998 |
| JP | 10318456 | 12/1998 |
| JP | 2002181263 | 6/2002 |
| JP | 2002295778 | 10/2002 |
| WO | 2001138769 | 5/2001 |
| WO | 2015018655 | 2/2015 |

OTHER PUBLICATIONS

International Search Report and Written Opinion dated Jan. 7, 2016 for PCT/US2015/052809.
Official Action issued in Eurasian Patent Application No. 201490686 dated Jul. 15, 2016.
Examination Report in Australian Patent Application No. 2012318605 dated Jan. 14, 2016 from the Australian Intellectual Property Office.
Office Action issued in corresponding Colombian Application No. 14-087.836 with English reporting thereof dated May 16, 2015.
Examination & Supplementary European Search Report issued in corresponding European Application No. 12838818.8 dated Jul. 14, 2015.
International Search Report and Written Opinion dated Sep. 13, 2017 for Application No. PCT/US2017/039096.
International Search Report and Written Opinion dated Mar. 9, 2018 for Application No. PCT/US2018/013967.
Examination Report in Australian Patent Application No. 2012318605 dated Apr. 22, 2015 from the Australian Intellectual Property Office.

* cited by examiner

PIPE DEPLOYMENT TRAILER

CROSS-REFERENCE TO RELATED APPLICATIONS

This application is a divisional of U.S. Non-provisional application Ser. No. 15/445,519 filed Feb. 28, 2017 and claims the benefit and priority benefit, of PCT International Patent Application Serial No. PCT/US2016/026673 filed Apr. 8, 2016 titled "Pipe Deployment Trailer", the disclosures of which are incorporated by reference herein in their entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a trailer, which may be used for loading, unloading, and deploying a coil of pipe. The trailer include a trailer base, a trailer bed pivotally mounted to the trailer base, at least one hydraulic actuator coupled to the trailer bed and the trailer base that raise and lower the trailer bed, the trailer bed being raised to a vertical position when the at least one hydraulic actuator is extended and the trailer bed being in a horizontal position when the at least one hydraulic actuator is retracted, and a lifting head protruding outwardly from the trailer bed, wherein a position of the lifting head is adjustable along a longitudinal axis of the trailer bed.

In another aspect, embodiments of the present disclosure relate to methods for manipulating a coil of pipe with a trailer that includes a trailer bed pivotally mounted to a trailer base and a lifting head disposed on the trailer bed, the lifting head having one or more arms protruding in an outwardly direction from the trailer bed. Methods may include adjusting a vertical position of the lifting head along the trailer bed to align the one or more arms of the lifting head with an interior channel extending through the coil of pipe and inserting the one or more arms of the lifting head through the interior channel of the coil of pipe to position the coil of pipe on the lifting head, wherein the coil of pipe and the trailer bed are in a vertical orientation during positioning the coil of pipe on the lifting head. The trailer bed may then be lowered to a horizontal orientation while the coil of pipe is positioned on the lifting head.

Other aspects and advantages of the claimed subject matter will be apparent from the following description and the appended claims.

DETAILED DESCRIPTION

Figure 1:
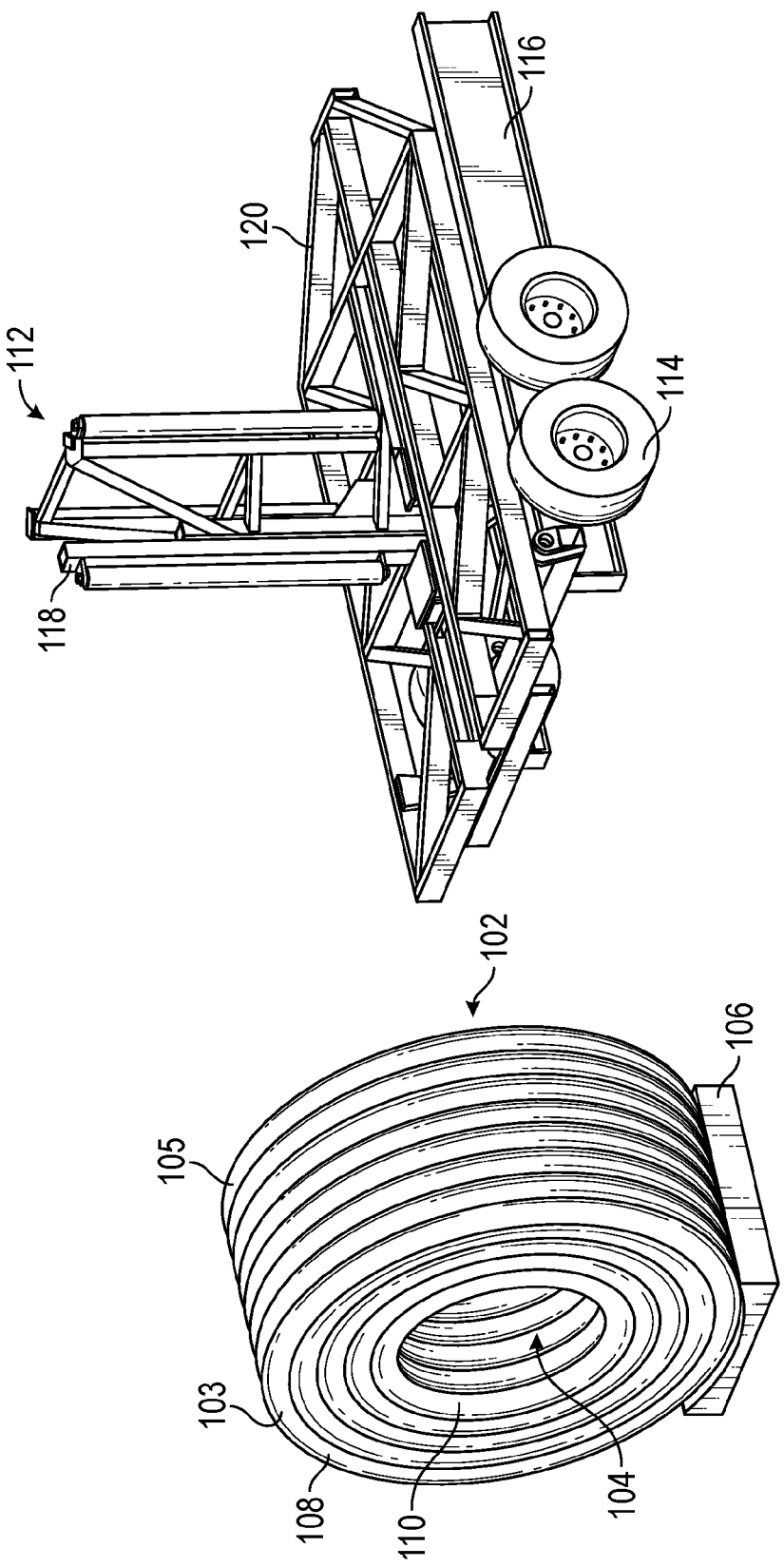
FIG. 1 is a diagram of a coil of pipe and a trailer according to embodiments of the present disclosure.

Embodiments of the present disclosure relate generally to trailers for use in transporting and/or deploying coils of pipe. Coils of pipe may be self supported, for example, using bands to hold coils together, or coils of pipe may be supported around a reel (which may be referred to as a reel of pipe). Trailers according to embodiments of the present disclosure may include a lifting head protruding outwardly from and movable relative to the trailer bed, where the lifting head may be used to hold or support a coil of pipe. In some embodiments, a lifting head may radially expand or contract to fit within and support the inner diameter of a coil of pipe, or in embodiments where a coil of pipe is supported around a reel, a lifting head may radially expand or contract to fit within and support the inner diameter of the reel of pipe. In some embodiments, a lifting head may include a single lifting arm (sometimes referred to as a "carpet pole"), which may be inserted through the inner diameter of a coil of pipe or reel of pipe.

Embodiments of the present disclosure will be described below with reference to the figures. In one aspect, embodiments disclosed herein relate to embodiments for a trailer configured to transport coils of flexible pipe to various sites.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 shows a diagram of a coil of pipe and a trailer according to embodiments of the present disclosure. According to embodiments of the present disclosure, trailer 112 is provided which may be used to load and deploy coil of pipe 102.

Coil of pipe 102 may be formed by wrapping pipe into a coil with an interior channel 104 formed axially therethrough, where the coil of pipe 102 may be moved as a single package or bundle of coiled pipe, as shown in FIG. 1. Each complete turn of coiled pipe may be referred to as a wrap of pipe. Multiple wraps of pipe in a coil of pipe may be configured in columns along an axial dimension of the coil of pipe and/or configured in layers along a radial dimension of the coil of pipe. For example, multiple columns of wraps may be formed along an axial direction of the coil of pipe, where the axial dimension of the coil of pipe is based on the diameter of the pipe and the number and axial position of wraps forming the coil of pipe 102. Further, multiple layers of wraps may be formed along a radial direction of the coil of pipe, where the radial dimension of the coil of pipe is based on the diameter of the pipe and the number and radial position of the wraps forming the coil of pipe. In one or more embodiments, coil of pipe 102 may be disposed on a reel, such as reel 702, which is further discussed below in FIG. 7. In one or more embodiments, trailer 112, (as shown in any of the figures included in the present disclosure) may be configured to load or unload a reel such as reel 702.

As shown in FIG. 1, coil of pipe 102 may be one or more layers (e.g., layers 108 and 110) of pipe packaged or bundled into a larger coil. Coil of pipe 102 may include at least one or more layers of pipe that have been coiled into a particular shape or arrangement. As shown in FIG. 1, coil of pipe 102 is coiled into a substantially cylindrical shape having substantially circular bases 103 and 105 formed on each end of coil of pipe 102, where the axial dimension of coil of pipe 102 is measured between the two bases 103, 105.

A pipe, as understood by those of ordinary skill, may be a tube to convey or transfer any water, gas, oil, or any type of fluid know those skilled in the art. The pipe used to make up coil of pipe 102 may be made of any type of materials including without limitation plastics, metals, a combination thereof, composites (e.g., fiber reinforced composites), or other materials known in the art.

In one or more embodiments, the pipe used to make up coil of pipe 102 may be a flexible type of pipe. Flexible pipe is used frequently in many applications, including without limitation, both onshore and offshore oil and gas applications. Flexible pipe may include Flexible Composite Pipe (FCP) or Reinforced Thermoplastic Pipe (RTP). A FCP I RTP pipe may itself be generally composed of several layers. In one or more embodiments, a flexible pipe may include a high-density polyethylene ("HDPE") pipe having a reinforcement layer and an HDPE outer cover layer. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel reinforced layer, helically wound steel strips may be placed over a liner made of thermoplastic pipe. Flexible pipe may be designed to handle a variety of pressures. Further, flexible pipe may offer unique features and benefits versus steel/carbon steel pipe lines in the area of corrosion resistance, flexibility, installation speed and re-usability.

Coils of pipe may be made with coil having an outer diameter ranging, for example, from about 2 inches (5.1 cm) to about 10 inches (25.4 cm). However, pipe having other dimensions may be coiled to form a coil of pipe and loaded to trailers according to embodiments of the present disclosure. Accordingly, pipe that that may be spooled or coiled into coil of pipe 102 may be made to suite a number of dimensions and may have any diameter useful to a particular project.

As known to those of ordinary skill in the art, pipe used to make up coil of pipe 102 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as 102, assists when transporting pipe, which may be several hundred feet in length in one or more embodiments. Further, coil of pipe 102 may be assembled as a coil to facilitate deployment of the coil. Deployment, as described above and used herein, may refer to the action of unspooling or unwinding the pipe from coil of pipe 102.

After being assembled into a coil, coil of pipe 102 may include an interior channel 104 formed axially through the coil of pipe 102. Interior channel 104 is a bore disposed generally in the center of coil of pipe 102. Interior channel 104 is substantially circular shaped. The coil of pipe 102 may have an outer diameter (OD) and an inner diameter (ID), where the inner diameter is defined by the interior channel.

In one or more embodiments, coil of pipe 102 may have an outer diameter ranging from about 92 inches (2.3 m), which may occur, for example, when coil of pipe 102 has at least two layers of 2 inch pipe, to about 192 inches (4.9 m). In one or more embodiments, a coil of pipe may have an inner diameter ranging, for example, from about 84 inches (2.1 m) to about 126 inches (3.2 m). Further, in one or more embodiments, a coil of pipe may have an axial dimension (width) ranging from about 5 inches (12.7 cm) to about 92 inches (2.3 m). However, these are merely exemplary measurements. Those of ordinary skill in the art will appreciate that any range of dimensions (inner and outer diameters and width) may be accommodated using one or more embodiments of trailer 112.

Skid 106 illustrated in FIG. 1 may be a platform upon which coil of pipe 102 may be disposed to hold the coil of pipe 102 in a vertical orientation. In one or more embodiments, coil of pipe 102 may be loaded and unloaded by trailer 102 while remaining on skid 106. In other embodiments, coil of pipe 102 may be disposed upon a reel, as further described below in FIGS. 7 and 8.

In one or more embodiments, trailer 112 may be connected or attached to another vehicle (not shown). The other vehicle may be configured to move trailer 112. As shown in FIG. 1, trailer 112 may include a set of wheels 114. FIG. 1 shows two wheels (114) disposed on either side of trailer 112. Those of ordinary skill in the art will appreciate that any number of wheels may be disposed along trailer 112. Further, any number of wheels may be disposed at the front or the rear of the trailer. Thus, according to one or more embodiments, trailer 112 is a mobile, transport unit that may be used to load and unload coil of pipe 102, as well as to transport coil of pipe 102 from one site to another. Trailer 112 may be moved/towed in a direction towards or away from coil of pipe 102 when coil of pipe 102 is not already loaded onto trailer bed 112.

In one or more embodiments, a trailer connection point provided on trailer 112 may be a hitch, such as a draw bar hitch. A draw bar hitch may be a type of tow hitch that includes a ball extending from a bar and configured to secure a hook or a socket combination for the purpose of towing or being towed. Those of ordinary skill in the art will appreciate that other types of tow hitches and attachment systems may be used to attach another vehicle to trailer 112.

Accordingly, a vehicle (not shown) may be fitted with a connector or attachment system known to those of ordinary skill in the art for connecting to trailer 112. In one or more embodiments, a vehicle used to tow trailer 112 may include without limitation, a dozer, a front end loader, or excavator, for example, when trailer 112 is fully loaded with one or more coils of pipe 102, or by standard trucks, automobiles, or other vehicles, for example, when trailer 112 is in an unloaded state (i.e. is not carrying any coils of pipe, such as coil of pipe 102). Trailer 112 may be further designed for off-road use, such that wheels 114 are also designed for off-road use. Thus, trailer 112 may be adapted for use with many types of roads and terrains.

In addition, trailer 112 may include built-in skid protection that also serves use as a sled on soft terrain. For example, in some embodiments, a trailer may include a metal plate on its undercarriage, under the base of the trailer, where the metal plate may be lifted from the ground to provide protection at the underside of the trailer and may optionally be lowered to the ground to act as a sled runner.

Furthermore, in one or more embodiments, trailer 112 may have a continuous track (also called tank tread or caterpillar track) to allow for propulsion of trailer 112 using a continuous band of treads or track plates. Thus, in one or more embodiments, a continuous band of treads or track plates may be disposed along either side of trailer base 116 around wheels 114 (any number of wheels 114 as needed). Further, in one or more embodiments, this band of treads or track plates may be made from modular steel plates. The large surface area of the tracks may help to distribute the weight of the vehicle better than steel or rubber tires and also provides added traction, which may also enable a trailer that is track driven, e.g. trailer 112, to traverse soft ground with less likelihood of becoming stuck due to sinking.

In some embodiments, trailer 112 may include a control unit for moving trailer 112 in any direction. In one or more embodiments, trailer 112 may be a self-driven unit.

According to one or more embodiments of the present disclosure, trailer 112 may range in size from 12 feet (3.7 m) to 16 feet (4.9 m). However, those of ordinary skill in the art will appreciate that trailer 112 may be of varying sizes and dimensions other than those listed above.

In one or more embodiments, coil of pipe 102 may be oriented in either an "eye to the side" (vertical) or "eye to the sky" (horizontal) orientation. As shown in FIG. 1, coil of pipe 102 is oriented in an "eye to the side" position such that it is at a vertical orientation (i.e. upright). In other words, when in an "eye to the side" orientation, interior channel 104 is not facing upwards. In an "eye to the sky" orientation (e.g., shown in FIG. 5), an opening to the interior channel 104 of the coil of pipe 102 may be facing upwards such that the coil of pipe 102 is longer in an upright position. In other words, coil of pipe 102 rests on one of its circular bases 103, 105 and is in a horizontal orientation.

Figure 5:
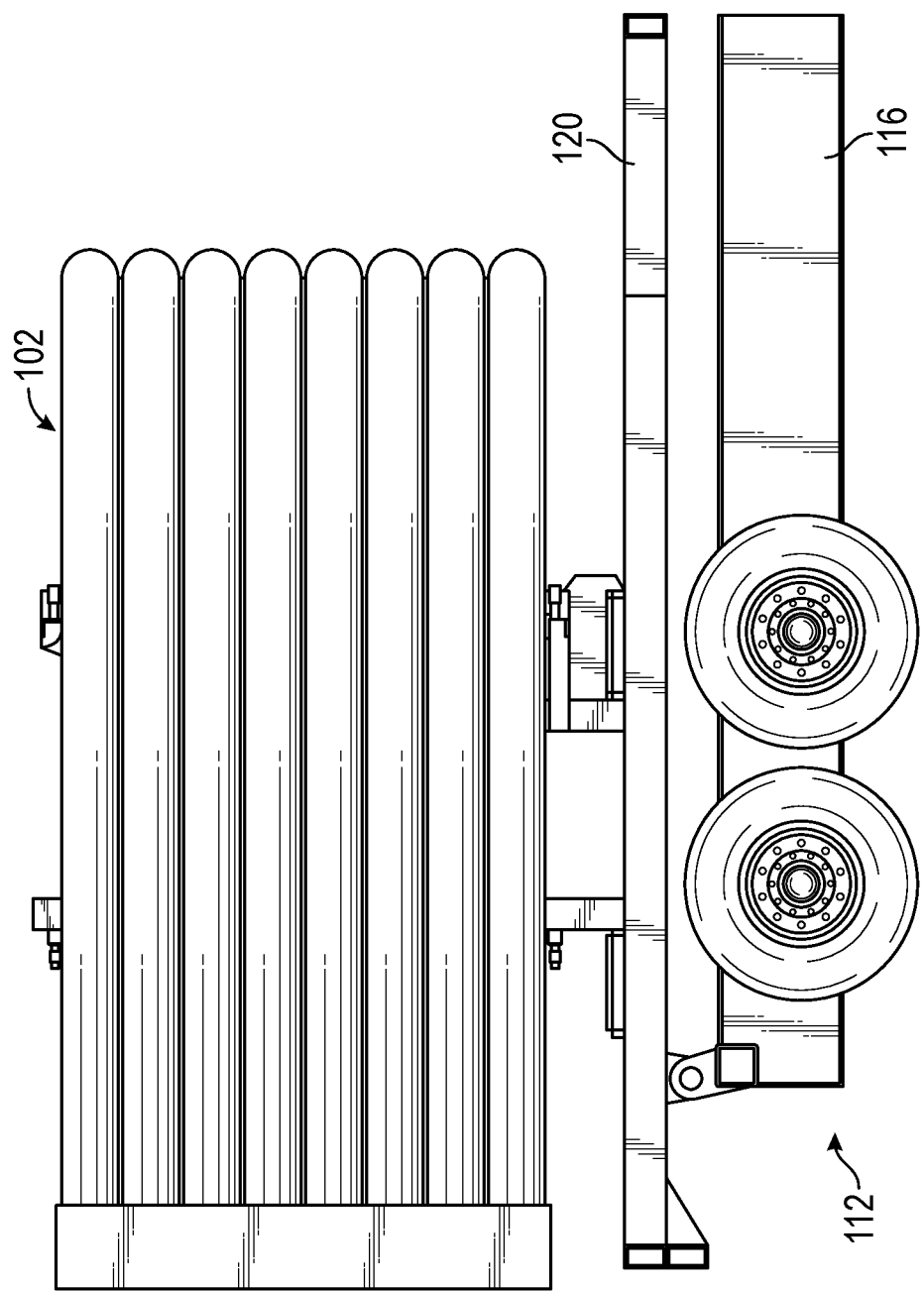
FIG. 5 is a diagram of a coil of pipe loaded on a trailer according to embodiments of the present disclosure.

[In accordance with one or more embodiments disclosed herein, coil of pipe may be "self-loaded" from an "eye to the side" position (e.g., as shown in FIG. 1) to an "eye to the sky" position (e.g., as shown in FIG. 5) using a trailer according to embodiments of the present disclosure. A trailer according to embodiments of the present disclosure capable of self-loading a coil of pipe from an eye to the side position to an eye to the sky position may include a trailer bed pivotally mounted to a trailer base, at least one hydraulic actuator coupled to the trailer bed and the trailer base and configured to raise and lower the trailer bed, and a lifting head protruding outwardly from the trailer bed, where the lifting head position is adjustable with respect to the trailer bed.

Figure 2:
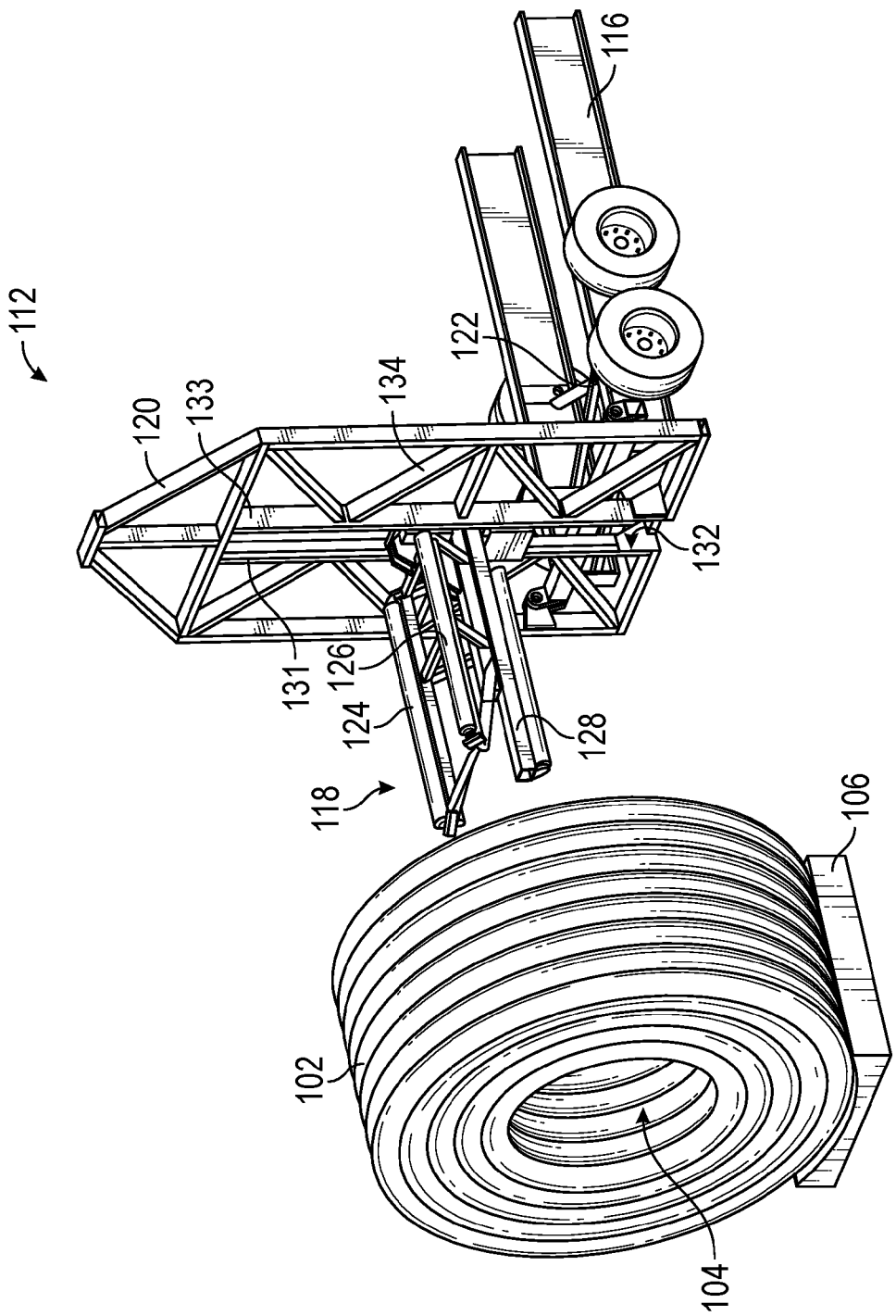
FIG. 2 is a diagram of a trailer bed raised to a vertical orientation according to embodiments of the present disclosure.
Figure 3:
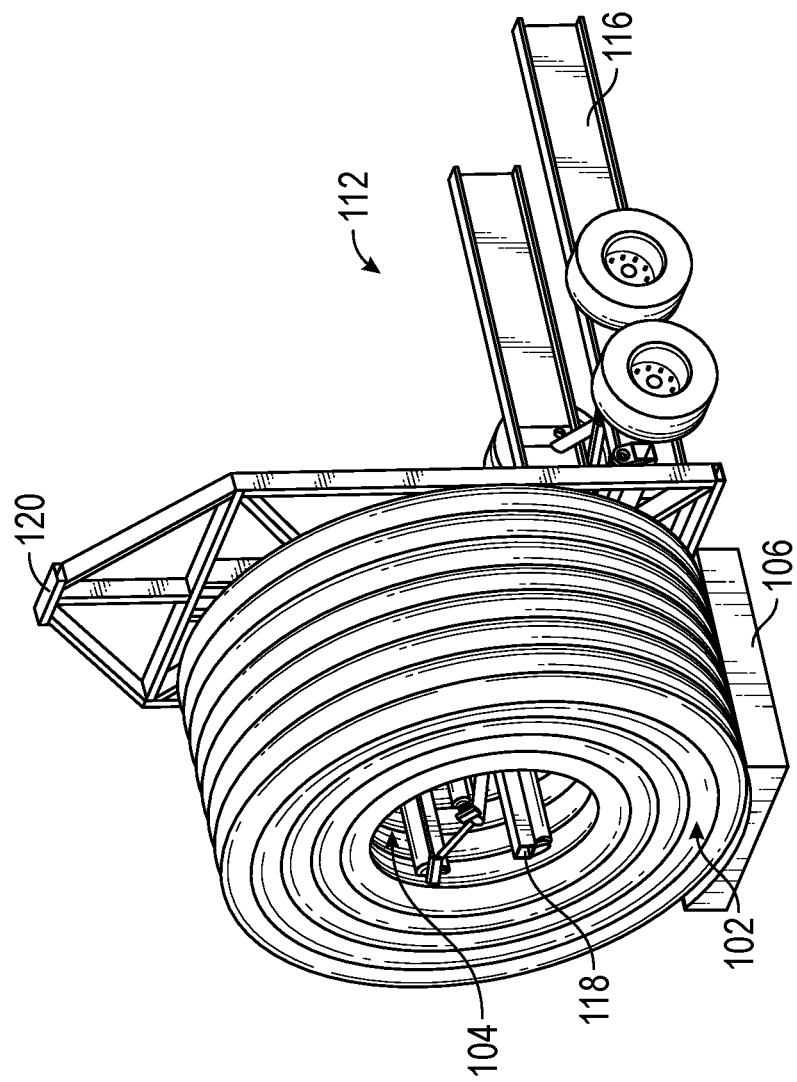
FIG. 3 is a diagram of a trailer configured to load a coil of pipe according to embodiments of the present disclosure
Figure 4:
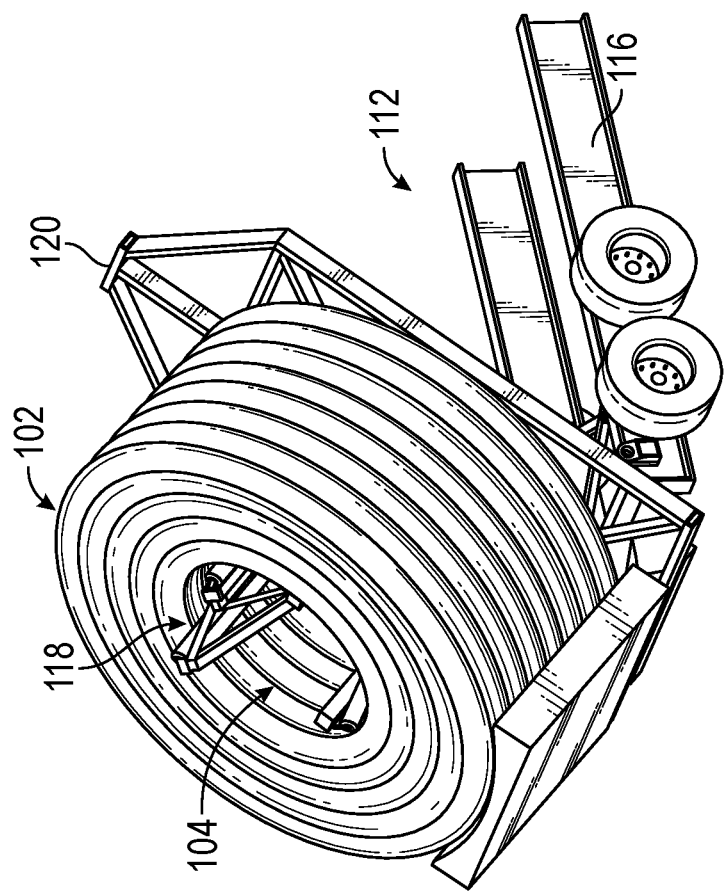
FIG. 4 is a diagram of a trailer loaded with a coil of pipe operating according to embodiments of the present disclosure.

For example, as shown in FIGS. 1-6, a trailer 112 may include trailer bed 120 pivotally mounted to a trailer base 116, such that trailer bed 120 is configured to tilt with respect to trailer base 116. Trailer bed 120 may be actuated to transition from being in a fully horizontal orientation (e.g., as shown in FIG. 1) to a fully vertical orientation (e.g., as shown in FIG. 2), where the fully vertical orientation is 90 degrees from the fully horizontal orientation. Also, trailer bed 120 may be configured to tilt to a partially vertical position (e.g., as shown in FIG. 4). In one or more embodiments, trailer bed 120 may be configured to tilt to and stay at an angle relative to the trailer base 116 ranging from, for example, 0 degrees (fully horizontal orientation and parallel with trailer base 116) to 90 degrees (fully vertical orientation), and in some embodiments, beyond 90 degrees relative to the trailer base 116, e.g., up to 180 degrees.

As shown in FIG. 2, trailer bed 120 may be raised or tilted to a fully vertical orientation (90 degrees from a fully horizontal orientation) and configured to operate in accordance with one or more embodiments of the present disclosure. The trailer bed 120 may be tilted with respect to the trailer base 116 using one or more actuators coupled to and extending between the trailer bed 120 and the trailer base 116.

For example, in one or more embodiments, trailer 112 may include one or more hydraulic cylinders 122. A set of hydraulic cylinders 122 may be a mechanism for moving the trailer bed 120 from a horizontal to vertical upright orientation and vice versa. Hydraulic cylinder 122 may also be referred to as a linear hydraulic motor, and is a type of mechanical actuator. In one or more embodiments, a set of hydraulic cylinders 122 may be hydraulically powered by a hydraulic power unit (HPU) (not shown). As understood in the art, an HPU may be used to power one or more hydraulic cylinders 122 may be powered by fuel (e.g. gasoline or diesel) and may include a number of hydraulic controls that are easily accessible. In one or more embodiments, an HPU may be located upon trailer bed 120 or on the trailer base 116 in a position for easy maintenance and replacement. Those of ordinary skill will appreciate that other systems and mechanisms for raising and lowering trailer bed 120 with respect to the trailer base 116 may be used including mechanical, pneumatic, electronic, and/or magnetic actuating systems.

Figure 6:
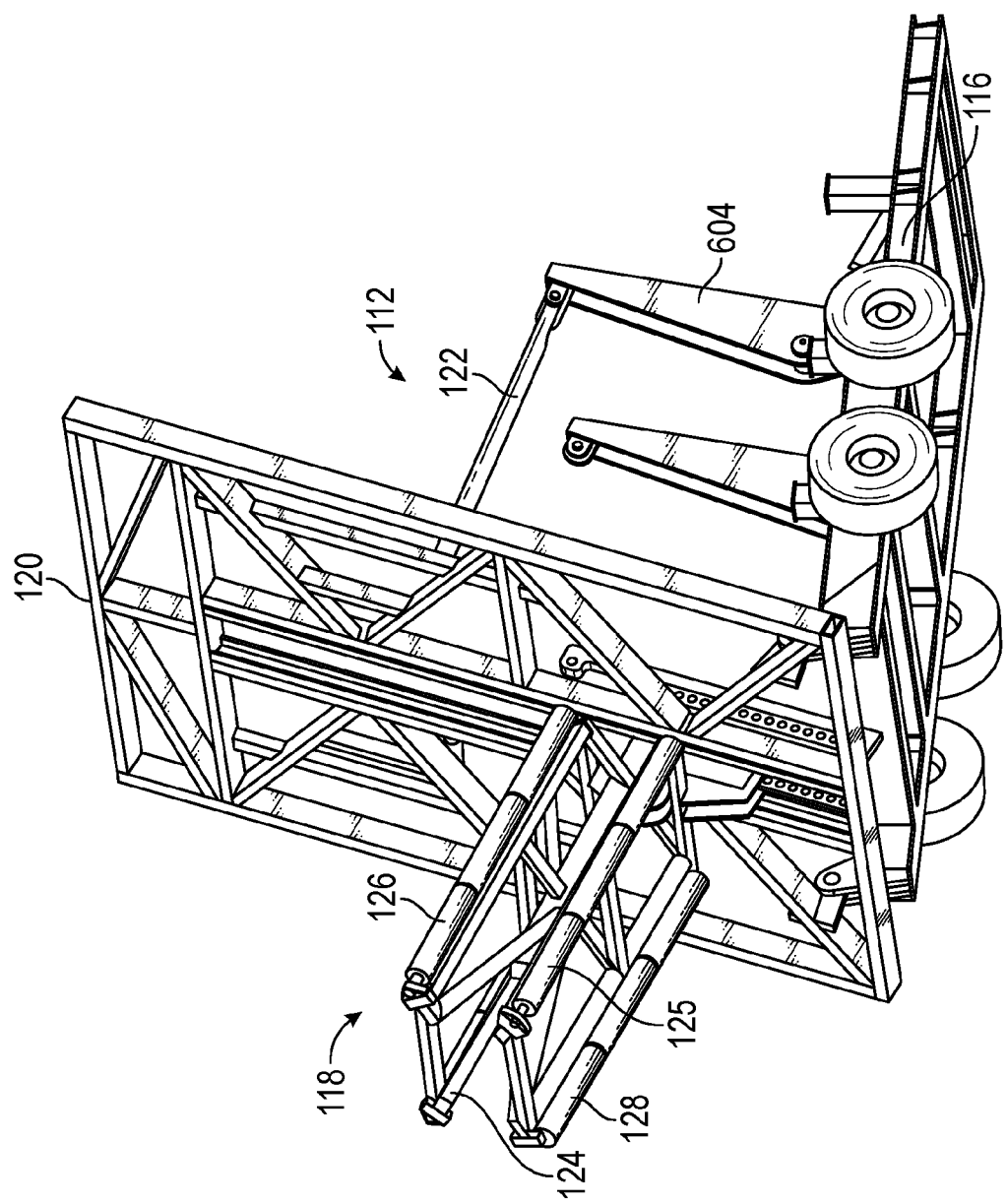
FIG. 6 is a diagram of a trailer according to embodiments of the present disclosure.

As shown in FIG. 6, in one or more embodiments, cantilever arms 604 may be coupled to hydraulic cylinders 122. Cantilever arms 604 may be coupled to trailer base 116 and used to raise and lower trailer bed 120 when hydraulic cylinders 122 are energized. Those of ordinary skill will appreciate that other lifting members, other than cantilever arms 604 may be utilized.

Further, in one or more embodiments, lifting head 118 may be disposed on trailer bed 120 and protrude outwardly from the trailer bed 120. A lifting head may protrude perpendicularly or non-perpendicularly and in a general outwardly direction away from a surface of a trailer bed, e.g., where a central axis of the lifting head extends outwardly from the trailer bed at an angle ranging from, for example, ±5 degrees, ±10 degrees or ±15 degrees from perpendicular to the trailer bed. For example, in some embodiments, the lifting head 118 may protrude perpendicularly from the trailer bed 120, where upon raising trailer bed 120 to a fully vertical orientation (e.g., as shown in FIG. 2), lifting head 118 protrudes horizontally from the trailer bed 120, such that lifting head 118 is parallel to the trailer base 116. In embodiments having the lifting head 118 protruding perpendicularly from the trailer bed 120, when the trailer bed 120 is in a fully horizontal orientation (e.g., as shown in FIG. 1), lifting head 118 protrudes vertically from the trailer bed 120, such that lifting head 118 is also perpendicular to the trailer base 116.

Figure 7:
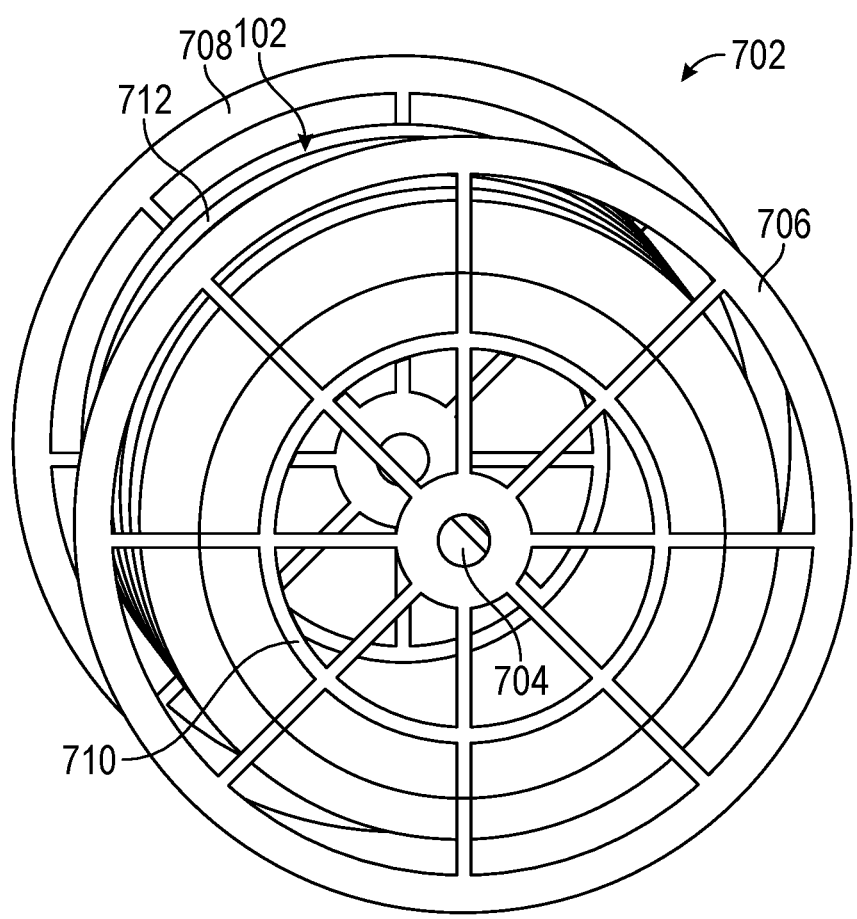
FIG. 7 is a diagram of a reel of pipe according to embodiments of the present disclosure.
Figure 8:
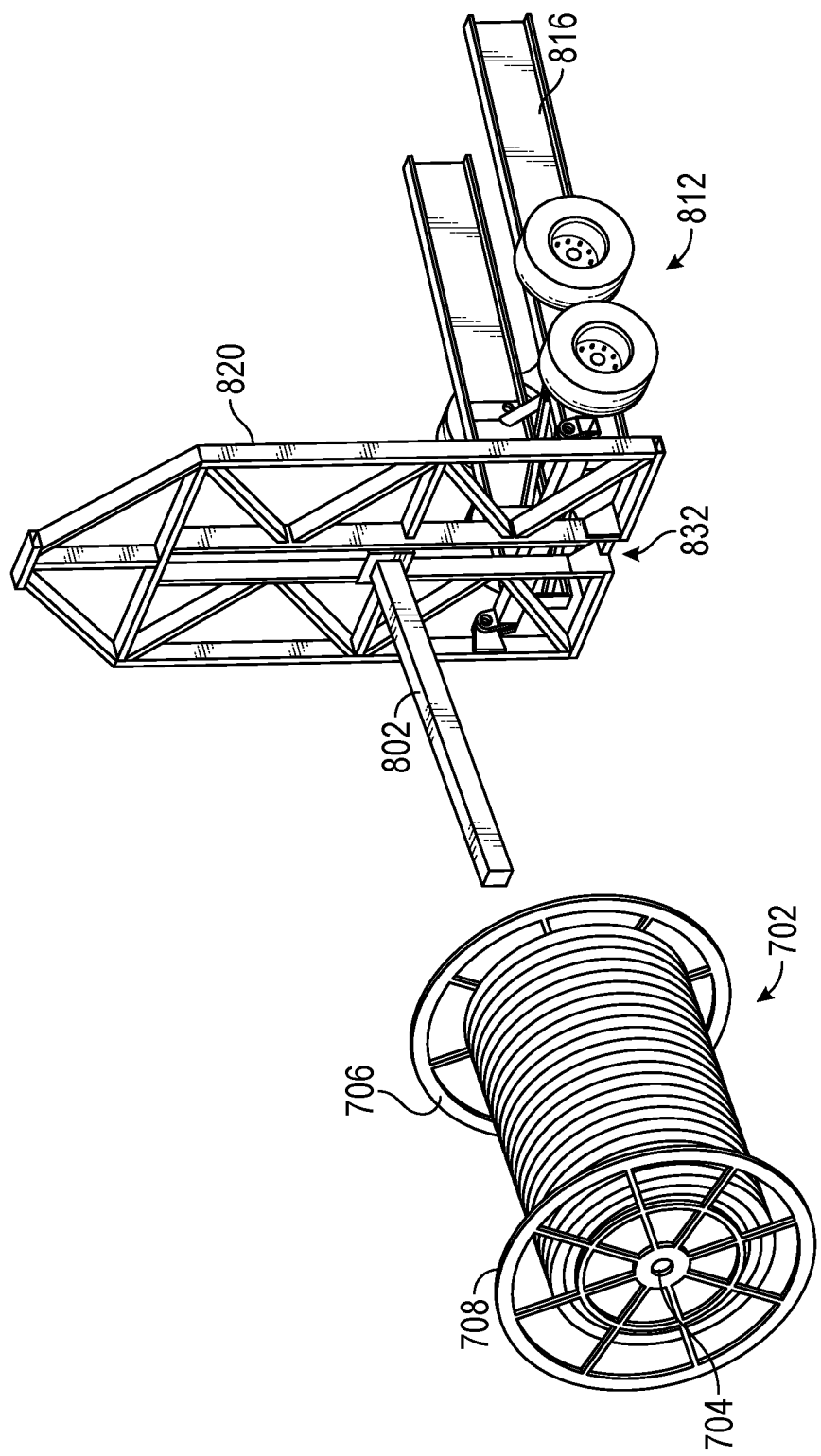
FIG. 8 is a diagram of a trailer and a reel of pipe according to embodiments of the present disclosure.

A lifting head as described herein may be a structure used to lift and support a coil of pipe 102 or a reel 702 (as shown in FIGS. 7 and 8). Thus, a lifting head, such as lifting head 118 may include one or more arms members protruding from the trailer bed 120 to engage with a coiled pipe structure, such as the arm assembly shown in FIG. 2 or the shaft 802 shown in FIG. 8.

As shown in FIG. 2, lifting head 118 may include one or more arm members, such as arm members 124, 126, and 128. Arm members may be circumferentially spaced about a central axis of the lifting head, may be linearly spaced about the lifting head, and/or may extend along the central axis of the lifting head (e.g., in embodiments having a lifting head with a single arm member or shaft protruding from the trailer bed, the single arm member may extend in-line with the central axis of the lifting head). For example, in the embodiment shown in FIG. 2, arm members 124 and 126 are aligned and disposed along a common linear position on the lifting head 118, and arm member 128 is disposed at second linear position linearly spaced from arm members 124 and 126. As shown in FIG. 2, arm 128 is disposed beneath arm members 124 and 126, but also at a midway point between arm members 124 and 126, such that the arm members 124, 126, and 128 are arranged to form a substantially triangular shaped arm assembly. The arm members 124, 126 and 128 may be in a fixed position or may be adjustable. For example, the linear spacing between arm members 124, 126 at the common linear position and arm member 128 at the second linear position may be adjusted to move the arm members 124, 126 apart from or closer to the arm member 128.

Those of ordinary skill in the art will appreciate that additional arm members and components may be added to lifting head 118 in accordance with the present disclosure, or a reduced number arm members may also be utilized in accordance with the present disclosure. For example, as shown in FIG. 6, in one or more embodiments, lifting head 118 may include four arm members, 124, 125, 126, 128, to form a substantially rectangular shaped arm assembly. In some embodiments, more than four arm members may be circumferentially spaced around a central axis of a lifting head. Further, in some embodiments, two arm members may be in a spaced apart configuration on a lifting head. In embodiments having two or more arm members protruding from a lifting head, the spatial distance between the arm members may be adjusted to reduce spacing there between and/or to increase spacing there between, for example, to fit within an interior channel of a coil of pipe and/or to engage an inner diameter of the interior channel of a coil of pipe.

In one or more embodiments, the arms of lifting head 118 may be adjustable to support a range of inner diameters of coil of pipe 102. Different coils of pipe may have differing interior channels defining different inner diameters. Accordingly, the arms of lifting head 118 may be capable of being expanded and retracted linearly to fit an inner diameter of coil of pipe 102. For example, arm member 124 and 126 may be transversely spaced apart and may be configured to extend outwards and inwards over a certain range of distance. Further, either arm member 124 or 126 or both may be individually adjusted so as to be positioned closer to or farther away from one another. The linear position of arm members 124 and 126 may be accomplished through any mechanical means known to those of ordinary skill in the art.

In one or more embodiments, lifting head 118 may be movably coupled to trailer bed 120, such that the position of the lifting head 118 may be adjusted relative to the trailer bed 120. For example, as shown in FIG. 2, a lifting head 118 may be coupled to a track 132 extending along a longitudinal axis of the trailer bed 120, where the lifting head 118 engages with and is movable along the track 132 to adjust the position of the lifting head 118 on the trailer bed 120.

Lifting head 118 may be movably coupled to track 132 via a lifting head base. For example, a lifting head base may be inserted into track 132 and slidable or otherwise movable along the track to adjust a position of lifting head 118 with respect to the trailer bed 120. In one or more embodiments, a lifting head base may be positioned on track 132 to be substantially in between a pair of track beams 131 and 133. The pair of track beams 131 and 133 may be configured to define the open channel of track 132. In one or more embodiments, pair of track beams 131 and 133 may be provided along a width of trailer bed 120 and extend along a length of the trailer bed 120. As shown in FIG. 2 and further shown in greater detail in FIG. 6, in one or more embodiments, the track 132 may extend along a longitudinal axis of the trailer bed 120, such that the lifting had 118 may be capable of being repositioned along the longitudinal axis of trailer 112.

In one or more embodiments, a lifting head base may be mechanically or automatically positioned and repositioned as needed along track 132. In one or more embodiments, a lifting head base may be coupled to one or more mechanisms for sliding along track 132. Those of ordinary skill in the art will appreciate that other mechanisms may be utilized as well.

As shown in FIG. 2, a trailer bed 120 may include a number of support bars 134 and/or beams extending between one or more edges of the trailer bed 120 defining an outer perimeter of the trailer bed 120. In one or more embodiments, support bars 134 may extend between track 132 formed along a length of the trailer bed 120 to one or more edges of the trailer bed 120.

Trailer bed 120 has a number of slots and openings defined by the one or more support bars 134 used to make up trailer bed 120. This exemplary arrangement of bars and beams with the slots in between may provide additional useful advantages. For example, such a configuration of trailer 112 as shown in FIG. 2 may provide sufficient space for an operator of trailer 112 to tie down any loose layers of pipe (e.g. layers 108 and 110) using any type of tie downs or bands know in the art. Alternatively, in other embodiments, trailer bed 120 may be a substantially solid piece without slots or openings except for track 132 so that lifting head 118 may be movable along track 132.

It is noted that while not shown in the Figures, it is in keeping with the present disclosure for any number of tie downs and straps to be used. Tie downs and straps may be tied around different sections of coil of pipe 102 to further secure the layers of coil of pipe 102 to prevent the layers from unspooling or falling over one over. Such tie downs and straps may be used while coil of pipe 102 is in an "eye to the side" or "eye to the sky" orientation. In one or more embodiments, a ratchet strap (not shown) may be used to tie down any loose layers of pipe or any uncoiled remaining pipe that may be present at the ends of coil of pipe 102.

A method for loading and/or unloading a coil of pipe may include using a trailer according to embodiments of the present disclosure. For example, methods of the present disclosure may include providing a trailer having a trailer bed pivotally mounted to a trailer base and a lifting head disposed on the trailer bed, the lifting head having one or more arms protruding in an outwardly direction from the trailer bed. A coil of pipe may be positioned on the lifting head when the coil of pipe and trailer bed are in a vertical orientation by adjusting a vertical position of the lifting head along the trailer bed to align the one or more arms of the lifting head with an interior channel extending through the coil of pipe and inserting the one or more arms of the lifting head through the interior channel of the coil of pipe. The trailer bed may then be lowered to a horizontal orientation while the coil of pipe is positioned on the lifting head to move the trailer loaded with the coil of pipe.

FIGS. 1-5 show stages of loading a coil of pipe 102 onto a trailer 112 according to methods of the present disclosure. However, one of ordinary skill in the art will appreciate that additional steps may be added to and/or some steps may be omitted from the steps shown in FIGS. 1-5.

As shown in FIG. 1, trailer 112 is in an unloaded state whereby trailer bed 120 is in a fully horizontal orientation, such that trailer bed 120 is parallel to trailer base 116 and lifting head 118 does not have a coil of pipe 102 positioned thereupon.

As shown in FIG. 2, trailer bed 120 may be raised from the trailer base 116 using one or more actuators coupled to the trailer bed 120 and the trailer base 116. The trailer bed 120 may be raised to a vertical orientation where the lifting head 118 protrudes from the trailer bed 120 in a direction substantially parallel with the trailer base 116. The lifting head 118 may be aligned with an interior channel 104 of the coil of pipe 102 by adjusting the position of the lifting head 118 along the trailer bed 120 to a shared vertical position (or height from the ground) with the interior channel 104.

As shown in FIG. 3, when protruding arm member(s) of the lifting head 118 is aligned with the interior channel 104 of a vertically oriented coil of pipe 102, the trailer 112 may be moved toward the coil of pipe 102 to insert the lifting head 118 into the interior channel 104 of the coil of pipe 102. As previously described, in one or more embodiments, trailer 112 may be operated by a vehicle connected to trailer 112. Such a vehicle may be used to back up trailer 112 to position trailer 112 close enough to coil of pipe 102 such that an assembly 118 extends through interior channel 104. Those of ordinary skill will appreciate that trailer 112 may also be pulled, pushed, or otherwise acted upon in order to position trailer 112 at a desired position so as to be able to load coil of pipe 102 onto trailer 112. In other embodiments, coil of pipe 102 may be brought toward trailer bed 120 and positioned onto lifting head 118. When inserted into the interior channel 104, the lifting head 118 may fully support the coil of pipe 102. The coil of pipe 102 may be freestanding in a vertical orientation or may be held by one or more mechanical mechanisms.

In accordance with one or more embodiments, trailer bed 120 has been raised to a fully vertical orientation, such that one or more hydraulic actuators configured to raise the trailer bed 120 is extended. As shown in FIG. 3, coil of pipe 102 may be loaded onto the lifting head 118 of trailer 112 while still disposed on skid 106. In one or more embodiments, coil of pipe 102 may be loaded onto arm assembly 118 of trailer 112 without being disposed on skid 106.

It is noted that lifting head 118 is positioned to be able to fit within the dimensions of interior channel 104 of coil of pipe 102. If an operator of trailer 112 needs to adjust the vertical position of lifting head 118, in one or more embodiments, lifting head 118 may be adjusted through automatic or mechanical means. Further, in embodiments having a lifting head with more than one arm member, the arm members of lifting head 118 may be adjusted in a manner to best fit the interior channel 104, for example, by spacing the arm members farther apart or closer together.

Upon loading the coil of pipe 102 onto the lifting head 118, such that the lifting head 118 supports and holds the coil of pipe 102, the lifting head 118 together with the loaded coil of pipe 102 may be moved with respect to the trailer bed 120 by adjusting the vertical position of the lifting head 118 along the trailer bed 120 (e.g., along a track extending longitudinally along the trailer bed, such as shown in FIG. 2).

FIG. 4 shows coil of pipe 102 loaded onto trailer bed 120 (via the lifting head 118) while trailer bed 120 is partially raised from the trailer base 116. By virtue of lifting head 118, coil of pipe 102 is retained to the trailer bed 120, i.e.

supported and held by lifting head 118, while trailer bed 120 is being lowered back towards a horizontal orientation. Also, as previously described, tie downs and/or other securing means may be used in conjunction with lifting head 118 and trailer bed 120 to retain the coil of pipe 102 to the trailer bed 120.

FIG. 5 shows coil of pipe 102 in an "eye to the sky" orientation and trailer bed 120 in a fully horizontal position while loaded with coil of pipe 102. Trailer 112 is now loaded with the coil of pipe 102 and may be moved from one location to another with coil of pipe 102 in such an orientation. Also, those of ordinary skill will appreciate, that trailer 112 may be moved (e.g., driven away or towed away) while trailer bed 120 is in vertical orientation (e.g., as shown in FIGS. 2 and 3).

Unloading of coil of pipe 102 may be accomplished by reversing the loading process. To unload coil of pipe 102, trailer bed 120 may be raised (e.g. hydraulically lifted using hydraulic cylinders 122 or using one or more other types of actuators) and the orientation of coil of pipe 102 changed in this manner from an "eye to the sky" to an "eye to the side" orientation. Accordingly, lifting head assembly 118 may be moved or repositioned along the trailer bed 120 as necessary to position the coil of pipe 102 as desired. In one or more embodiments, coil of pipe 102 may be unloaded directly onto the ground by lowering lifting head 118 to a position suitable for unloading coil of pipe 102 to the ground level. Further, coil of pipe 102 may be unloaded onto any type of additional trailer (e.g. lowboy trailer) or vehicle from trailer 112. This may be accomplished by using the tilting actions of trailer bed 120 as well as the repositionable lifting head 118 to unload coil of pipe 102 onto a surface of another trailer or vehicle. The trailer 112 may then be moved away from the now upright, "eye to the side" coil of pipe 102 after unloading from trailer bed 120.

Embodiments of the present disclosure may include a trailer having at least one actuator configured to raise and lower a trailer bed having a lifting head disposed thereon, such as shown in the embodiments of FIGS. 1-6, or a trailer may have at least one actuator configured to raise and lower a lifting head apart from the trailer bed. For example, according to embodiments of the present disclosure, a trailer may include a trailer base, a trailer bed (either pivotally or non-pivotally mounted to the trailer base), and a lifting head protruding in an outwardly direction from the trailer bed and the trailer base when the lifting head is in a first orientation (e.g., in a horizontal orientation), where the position of the lifting head is adjustable along a longitudinal axis of the trailer bed. At least one actuator may be coupled to the trailer base and either the trailer bed or the lifting head. When the actuator(s) is in an actuated state, the lifting head may be raised to a second orientation (e.g., a vertical orientation) by the actuator(s), and when the actuator(s) is in a non-actuated state, the lifting head may be in the first orientation (e.g., horizontal orientation).

For example, when an actuator is coupled to a trailer base and a lifting head, the lifting head may be raised or lowered independently of the trailer bed. When an actuator coupled between the trailer base and the lifting head is in an actuated state (e.g., expanded or retracted), the lifting head may be moved from a first orientation to a second orientation apart from the trailer bed and the trailer base. When an actuator is coupled to a trailer base and a trailer bed (on which a lifting head is disposed), the lifting head may be raised or lowered together with the trailer bed. When an actuator coupled between the trailer base and the trailer bed is in an actuated state (e.g., expanded or retracted), the trailer bed and attached lifting head may be moved from a first orientation to a second orientation apart from the trailer base.

Turning to FIG. 7, FIG. 7 illustrates an embodiment of a reel 702 of pipe. In many instances, a coil of pipe 102 may be wound around the components of a reel, such as reel 702, instead of transported as a bundled, freestanding package (e.g., as shown in FIG. 2). The coil of pipe may be wound around a reel such that the interior channel of the coil of pipe is concentric with a central bore of the reel. A reel as understood by those of ordinary skill may include a cylindrical drum, such as cylindrical drum 710, around which layers of pipe may be wrapped to form a coil of pipe, such as coil of pipe 102. Reel 702 may include two substantially circular reel ends 706 and 708 that are capable of turning about a shared axis. Accordingly, reel ends 706 and 708 may be attached to cylindrical drum 710.

As shown in FIG. 7, a bore 704 is disposed in each end 706 and 708 at a substantially central position. In addition, the bores 704 for each end 706 and 708 are substantially aligned with each other (and may also be aligned with a central axis of cylindrical drum 710). Pipe 712 (e.g. flexible pipe) may be wound around cylindrical drum 710 using any means know to those of ordinary skill in the art.

FIG. 8 illustrates an embodiment of a trailer 812 that may be used in conjunction with loading, unloading, and deploying a reel of pipe, such as reel 702. In one or more embodiments, shaft 802 may be disposed on and/or coupled to trailer bed 820 via a lifting head base, as shown in FIG. 8. In one or more embodiments, shaft 802 may be configured to act as a spike or pole that protrudes outwardly from trailer bed 820. Further, shaft 802 may be disposed perpendicular to or substantially perpendicular to trailer bed 820.

Shaft 802 may be used to support reel 702 upon being inserted into a central bore of reel 702. In addition, shaft 802 may be attached to an adjustable lifting head base that is configured to move either up or down track 832 of trailer bed 820. This may be beneficial in locating shaft 802 at a position along track 832 and trailer bed 820 that is most suitable for properly loading and unloading reel 702. Accordingly, according to one or more embodiments provided herein, coil of pipe 102 may be disposed on reel 702, and may be loaded and unloaded onto trailer 812. In addition, pipe 712 wound around reel 702 may be deployed directly from reel 702 while loaded onto shaft 802 and still loaded on trailer 812.

A method in accordance with one or more embodiments for loading reel 702 onto shaft 802 is described below. Reel 702 and shaft 802 may be positioned so as to be within a suitable distance from one another. In one or more embodiments, trailer 812 may be positioned proximate to reel 702 by moving trailer 812 towards reel 702. Alternatively, reel 702 may be moved to be proximate to trailer 812.

Trailer bed 820 may be raised to a fully vertical orientation (as shown in FIG. 8) such that shaft 802 protrudes outwardly from one side of the trailer bed 820 and shaft 802 is substantially parallel with a longitudinal axis of trailer base 816. As shown in FIG. 8, reel 702 may be positioned so that reel end 706 is the proximal end that faces trailer bed 820 and also faces shaft 802. In one or more embodiments, shaft 802 may be inserted into bore 704 of end 706 so as to pass through the central bore of cylindrical drum 710 (shown in FIG. 7), and extend completely through the bore 704 of the distal end 708. In the above-described method, shaft 802 is inserted into a central bore of reel 702. The shaft 802 may be inserted partially through the central bore of reel 702 or completely through the central bore of reel 702 from one end 706 to opposite end 708 of reel 702. In other embodiments, reel 702 may be pushed onto shaft 802 by positioning proximal end 706 onto shaft 802 (i.e. through bore 704 of end 706) and urging the remainder of reel 702 onto shaft 802.

Shaft 802 may be repositionable if needed in an up and down direction along track 832 so as to aligned with and fit within bore 704 of reel 702. After the reel 702 of pipe has been mounted to the shaft 802, trailer bed 820 may be lowered to a horizontal orientation using one or more actuators, e.g. hydraulic cylinders, to lower the trailer bed 820 towards trailer base 816. Accordingly, trailer 812 may be transported to other locations while fully loaded with reel 702 of pipe. In some embodiments, a trailer may include a lifting head having multiple arm members (instead of shaft 802) that has been configured to be insertable within a central bore of a reel of pipe so as to support and hold the reel of pipe, such as reel 702.

In one or more embodiments, deployment of pipe 712 from reel 702 may be achieved while reel 702 is still loaded on trailer bed 820 and supported by shaft 802. To deploy pipe 712 from reel 702 while reel 702 is still loaded, the trailer bed 820 may be configured to be in a vertical or a horizontal orientation as needed.

It is noted that there are other instances whereby coils of pipe may be transported and/or deployed without using a reel. For example, U.S. Pat. No. 8,985,496, which is incorporated for reference in its entirety, and is also assigned to the present assignee, discloses an expandable drum assembly that may be used for storing, transporting, or deploying coils of flexible pipe. Accordingly, in one or more embodiments, it may be feasible to utilize an expandable drum assembly as described in one or more embodiments of U.S. Pat. No. 8,985,496 instead of a reel, such as reel 702. A trailer according to embodiments of the present disclosure having a trailer bed pivotally mounted to a trailer base and a lifting head adjustably positioned on the trailer bed may be used to load, unload and/or deploy pipe from an expandable drum assembly, where a protruding portion of the lifting head may be inserted into a central bore of the expandable drum assembly to support and hold the expandable drum assembly to the trailer bed.

Figure 9:
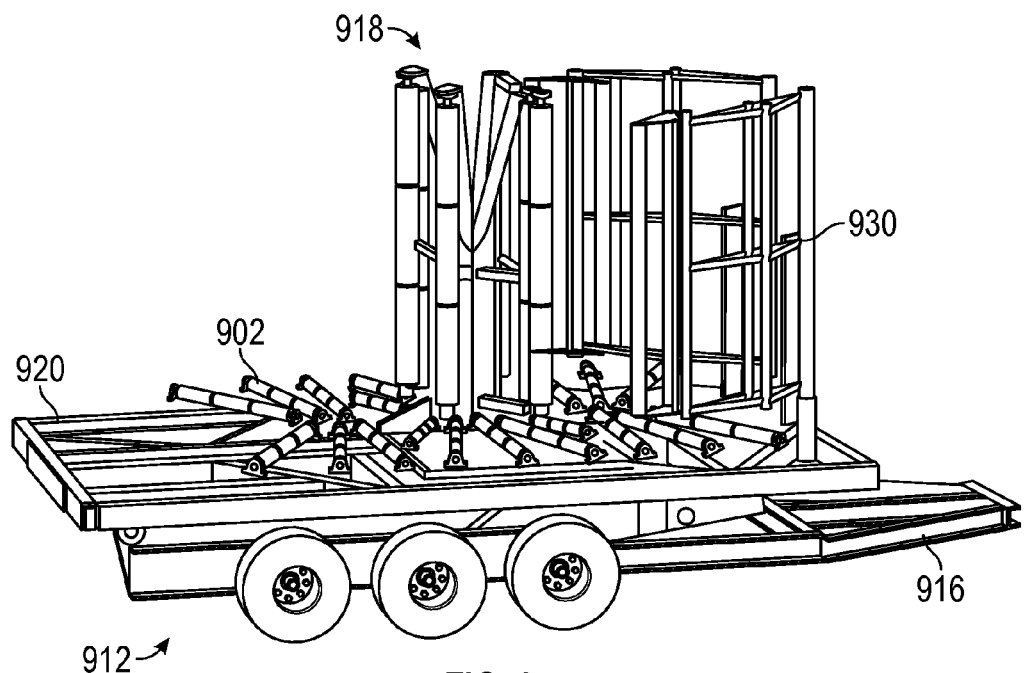
FIG. 9 is a diagram of a trailer that includes a set of rollers according to embodiments of the present disclosure.
Figure 10:
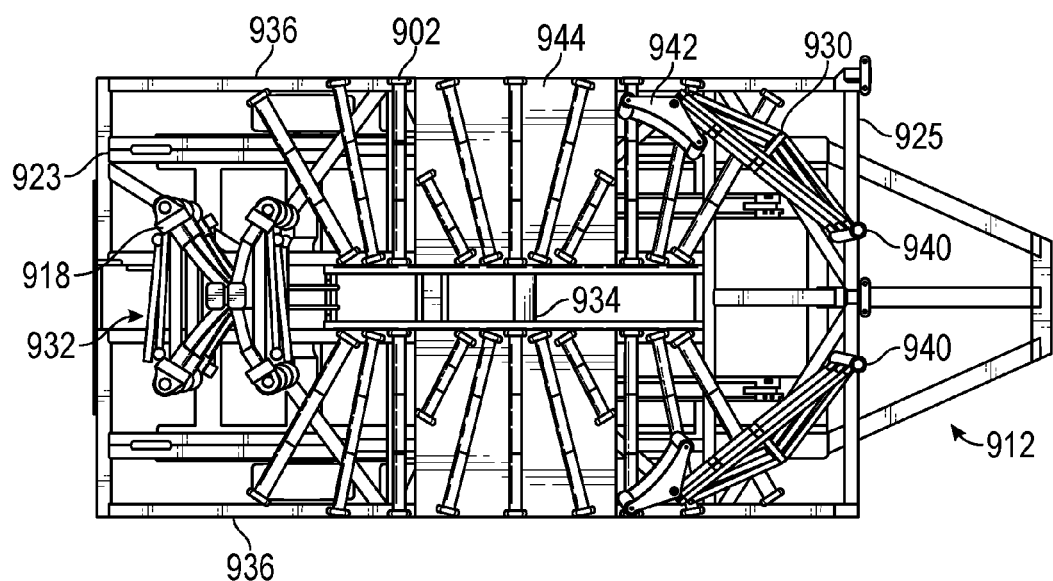
FIG. 10 is a top end view of a trailer that includes a set of rollers with a slide table according to embodiments of the present disclosure.
Figure 11:
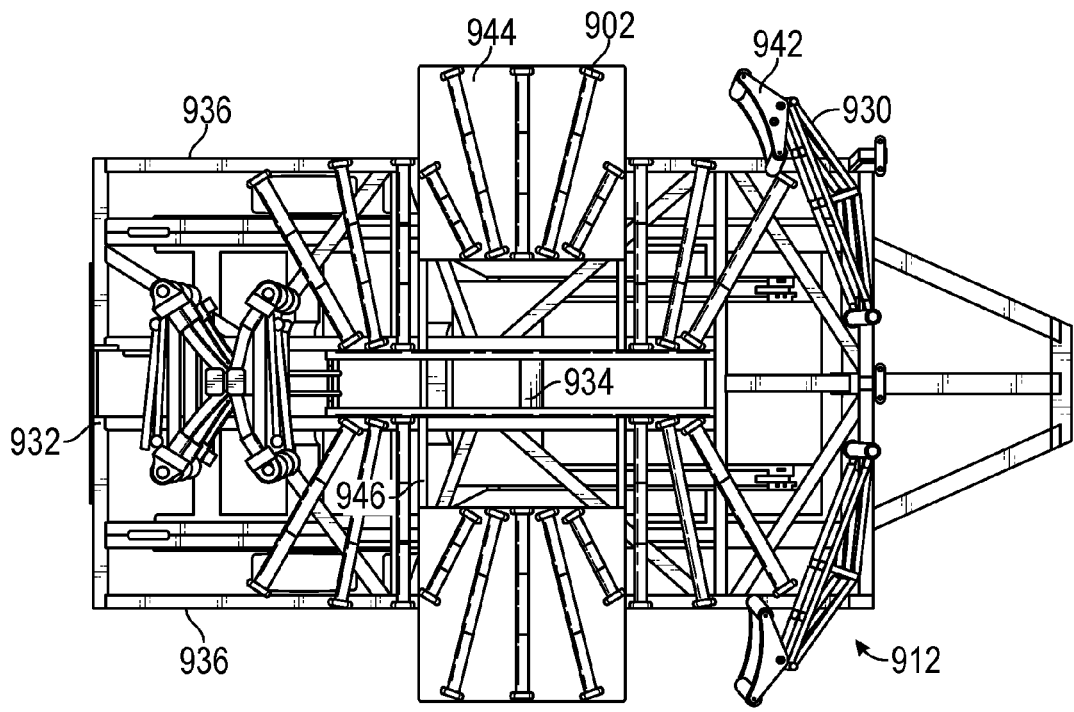
FIG. 11 is a top end view of the trailer of FIG. 10 that includes a set of rollers with a slide table extended according to embodiments of the present disclosure.
Figure 12:
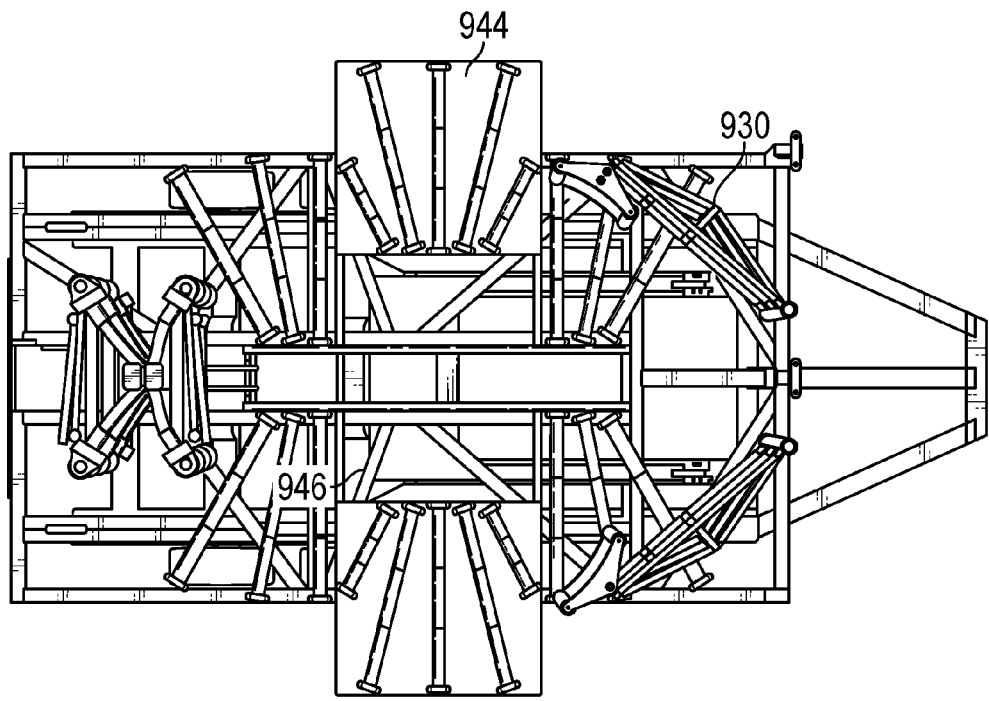
FIG. 12 is a top end view of the trailer in FIG. 10 with the slide table extended and containment arms also extended according to embodiments of the present disclosure.
Figure 13:
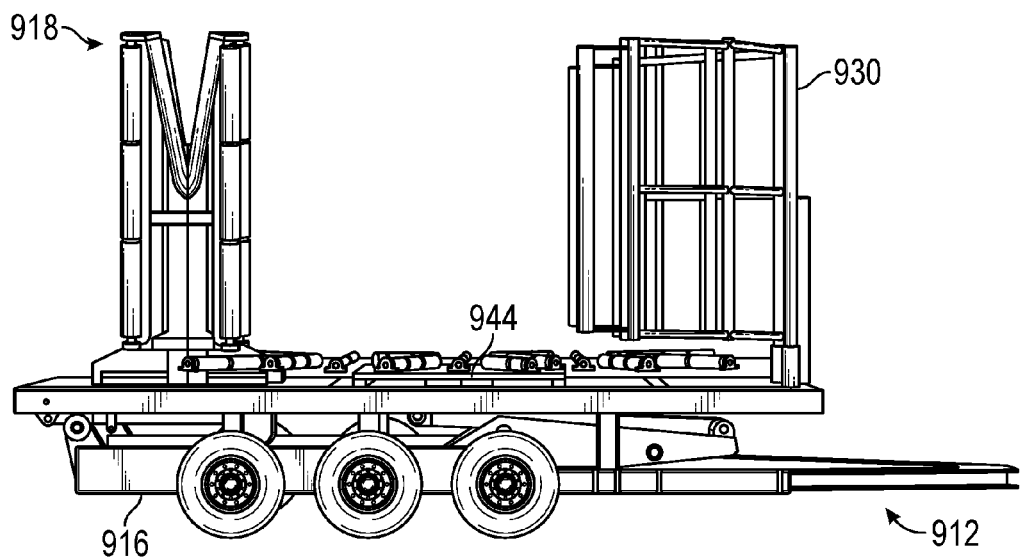
FIG. 13 is a side end view of the trailer of FIG. 10 with the trailer bed in a horizontal orientation according to embodiments of the present disclosure.
Figure 14:
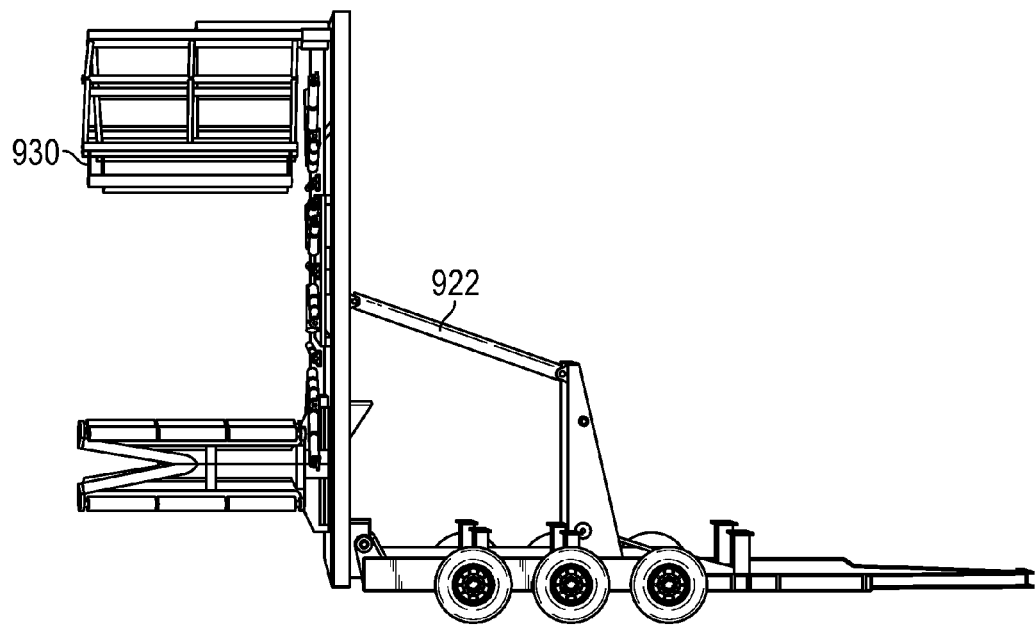
FIG. 14 is a side end view of the trailer of FIG. 10 with the trailer bed in a vertical orientation according to embodiments of the present disclosure.
Figure 15:
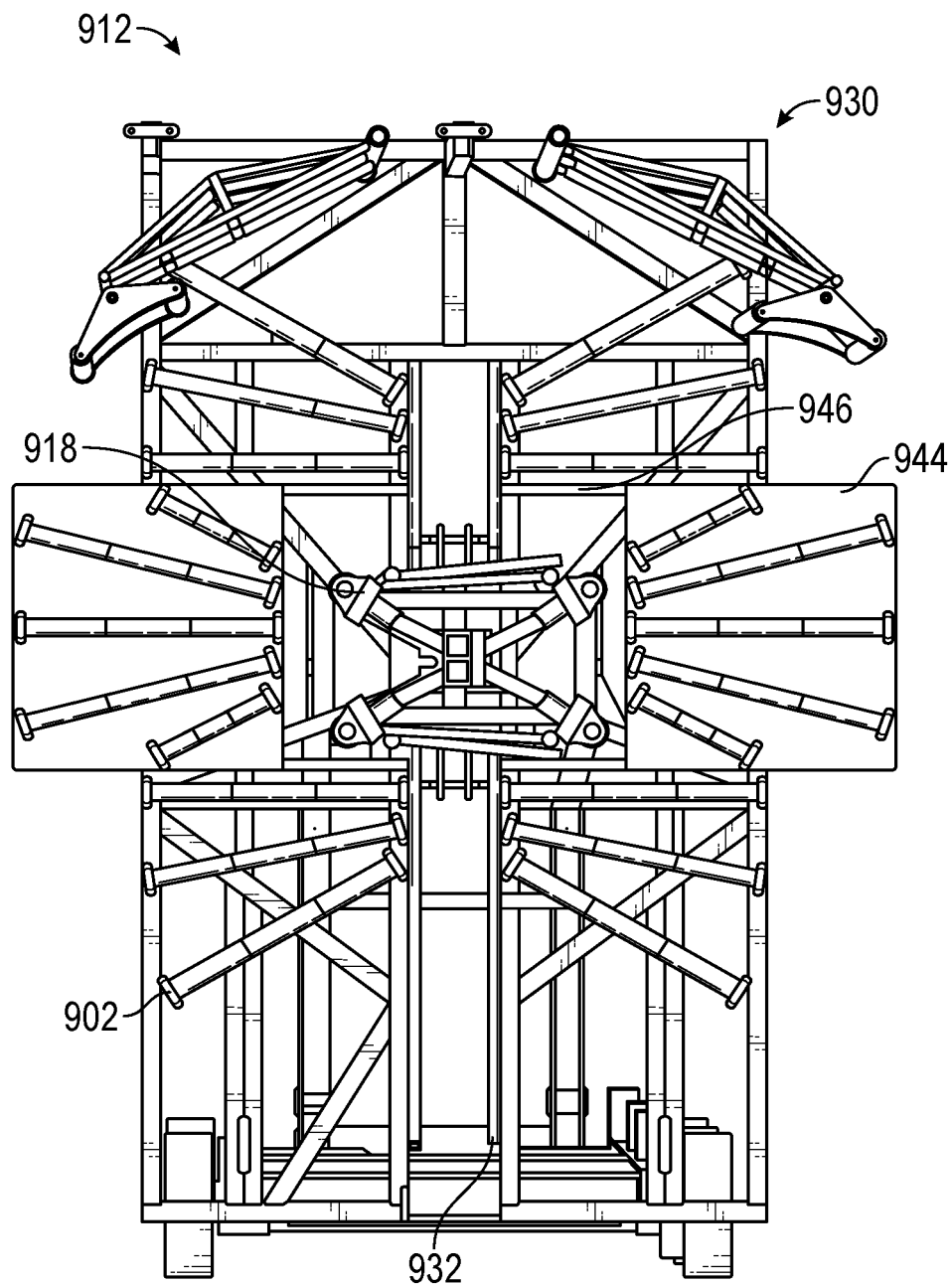
FIG. 15 is a front end view of the trailer of FIG. 10 with the slide table extended according to embodiments of the present disclosure.

Turning to FIGS. 9-15, several views are provided of a trailer having a set of rollers that may be used in accordance with one or more embodiments of the present disclosure. FIG. 9 provides a perspective view of trailer 912; FIG. 10-12 show top views of trailer 912; FIGS. 13 and 14 show side views of trailer 912; and FIG. 15 shows a front view of trailer 912 in raised or lifted position. In one or more embodiments, trailer 912 may be used in accordance with the description provided above for trailer 112 and may include any of the features/functions of trailer 112.

Trailer 912 includes a set of rollers 902. Set of rollers 902 may be roller units arranged on a surface of trailer bed 920 that are capable of rotational movement and are configured to act as supports for a coil of pipe when mounted to the trailer bed 920. The coil of pipe may bear against rollers 902 and urged to turn while disposed upon rollers 902. Set of rollers 902 may be configured in multiple orientations, shapes, and sizes, and are not limited to the generally cylindrical shape depicted in FIGS. 9-15. In one or more embodiments, other types of mechanisms as known to those of ordinary skill may be used in place of rollers 902 which are capable of turning or rotational movement. For example, multiple wheels may be used and may be coupled to trailer bed 920. Further, in one or more embodiments, set of rollers 902 are fixed in place. For example, set of rollers 902 may be rotationally affixed to trailer bed 920 (such that the rollers may rotate but remain in a fixed location along the trailer bed 920) using bolts, screws, or any suitable means known to those of ordinary skill in the art to affix rollers 902 in place.

According to one or more embodiments, a set of rollers 902 may extend along the trailer bed 920 in a radial direction from a central reference point 934 (as shown in FIGS. 10-12) to one or more edges 936 defining an outer perimeter of trailer bed 920. Central reference point 934 may be located a distance along a length of the trailer bed, where the length of the trailer bed extends along a longitudinal axis of the trailer bed from a base edge 923 at an end of the trailer bed pivotally mounted to the trailer base to an upper edge 925 at an opposite end of the trailer, wherein the distance is greater than a radius of a coil of pipe.

In some embodiments, such as shown in FIGS. 10-12 and 15, central reference point 934 may be located along a track 932 formed in the trailer bed 920, such that rollers 902 are positioned to radially extend away from track 932 and to one or more edges (e.g. 936) of the trailer bed. In one or more embodiments, rollers 902 are retained within the outer perimeter of trailer bed 920. While the embodiment shown in FIGS. 9-15 includes a number of rollers forming set of rollers 902, those of ordinary skill will appreciate that a greater or lesser number of rollers may be disposed and arranged as desired. For example, six, eight, or more rollers may be arranged circumferentially around a central reference point, extending in a direction radially outward from the central reference point.

A central reference point may be a distance along the length of the trailer bed 920 that may best accommodate larger sized coils of pipe so that the full outer diameter of the coil of pipe may fit within the length of the trailer bed 920. In some embodiments, the outer diameter of a coil of pipe to be loaded on a trailer bed may be smaller than and fit within the outer perimeter of the trailer bed. According to embodiments of the present disclosure, a central reference point may be a distance from a base edge of the trailer bed greater than the radius of a coil of pipe to be loaded on the trailer bed. In some embodiments, a central reference point may be at a distance along a middle portion of the trailer bed, the middle portion extending within 5 percent, 10 percent or 20 percent the length of the trailer bed from the half point of the length of the trailer bed. In one or more embodiments, trailer 912, (as shown in any of the figures included in the present disclosure) may be configured to load or unload a reel such as reel 702.

A benefit of having an adjustable lifting head 918 (whether the lifting head includes an arm assembly or a shaft, such as shaft 802) is that the lifting head 918 may be raised or lowered to the central reference point of trailer bed 920 so as to position a coil of pipe (e.g., reel 702 of pipe or coil of pipe 102) on top of the set of rollers 902. For example, there may be circumstances whereby a coil of pipe (e.g., reel 702 of pipe) is initially located at a position along the trailer bed 920 that is not at the same as the central reference point between a fixed set of rollers 902. Upon mounting the coil of pipe to the adjustable lifting head 918, the adjustable lifting head 918 may be raised or lowered so as to be positioned substantially over central reference point 934. FIG. 15 shows a front end view of trailer 912 with lifting head 918 positioned generally on central reference point 934 such that a coil of pipe (or reel) may rest against set of rollers 902 so as to benefit from the rotational movement imparted on the coil of pipe by the set of rollers 902 during deployment. Accordingly, lifting head 918 may be raised or lowered along track 932 in accordance with the embodiments discussed above with respect to track 132.

Rollers 902 may be useful for providing bearing support that facilitates the overall rotational movement of a coil of pipe, for example, as the coil of pipe is being deployed. As shown in FIG. 9, according to one or more embodiments, rollers 902 are generally circumferentially arranged around trailer bed 920. Such a circumferential arrangement may ensure that a rotational support member (roller) is disposed at each area of trailer bed 920 that a coil of pipe may make contact with. For example, one of ordinary skill will understand that to uncoil a coil of pipe, an unsecured end of pipe is pulled in a direction away from a trailer 912 on which the coil of pipe is mounted. As the coil of pipe is unwound, the layers of coil of pipe may contact each roller of rollers 902, which enables the coil of pipe to make complete 360 degree rotational turns as an unsecured end of pipe is pulled away from trailer 912. When the coil of pipe has completed all of the turns required to fully unwind the coil of pipe, then the coil of pipe has been fully deployed (i.e. unwound).

In accordance with embodiments described above, as pipe is pulled, the coil of pipe may rotate around lifting head 918, which may also cause rollers 902 to begin rotating in place. Bed of rollers 902 may thus provide rotational movement that translates to a loaded coil of pipe and assists in deploying, i.e., unspooling, the coil of pipe. As discussed above with respect to FIGS. 1-6, lifting head 918 may adjust to support a coil of pipe 102 from its inner diameter. Lifting head 918 may be configured to adjust to suitably fit the inner diameter of a variety of coils of pipe. Further, lifting head 918 may be adapted to engage with track 934 to be positioned anywhere along track 934. As shown in FIG. 13, trailer bed 920 may be disposed in a horizontal orientation and may be pivotally coupled to trailer base 916. FIG. 14 shows that, in accordance with one or more embodiments, one or more actuators (e.g. 922) may be actuated to extend trailer bed 920 to a vertical orientation. Actuator 922 may be an exemplary actuator in accordance with the embodiments discussed above with respect to FIGS. 1-6. In other words, actuator 922 may be hydraulically powered to raise and lower (or tilt at any angle) trailer bed 920. In other embodiments, lifting head 918 may be configured as a shaft, such as shaft 802, which may be used to load, unload, and deploy coiled pipe disposed on a reel. Thus, trailer 912 is configured to have a trailer bed 920 that may be raised and lowered to alter the orientation of a coil of pipe or reel when loaded.

FIGS. 9-15 further illustrate containment arms 930 in accordance with one or more embodiments of the present disclosure. Containment arms 930 may be extended (as shown in FIGS. 9, 10, and 12-14) or compressed (as shown in FIGS. 11 and 15). Containment arms 930 may include individual arms (e.g. two individual arms as shown in FIGS. 9-15) which may be adjusted to move towards or away from central reference point 934. In one or more embodiments, containment arms 930 may be affixed to upright support members 940 that are affixed to a surface of trailer bed 920. Containment arms 930 may be adapted to pivot outwardly from support members 940 when extended and may also be adapted to pivot inwardly towards support members 940 when retracted (i.e. compressed). Containment arms 930 may further include stabilizers 942 disposed on a top edge of containment arms 930.

Containment arms 930 may function as structural supports that further contain a coil of pipe or reel disposed on trailer bed 920. Containment arms 930 may provide greater control of one or more layers of a coil of pipe, particularly during deployment of a coil of pipe or reel. Further, in one or more embodiments, stabilizers 942 may provide tension against an outer surface of a coil of pipe or reel that is being deployed. Further, containment arms 930 may assist during re-packaging/respooling of pipe into shipment quality coils. It is noted that containment arms such as containment arms 930 may be included in any of the embodiments described in the present disclosure for trailer bed 120 or any other trailer bed, e.g., 1620 in FIGS. 16-19 and 2020 in FIG. 20.

In one or more embodiments, a slide table, e.g. slide table 944 may be included with trailer bed 920 (as shown in FIGS. 9-15). In one or more embodiments, slide table 944 may include two sections disposed on either side of track 934. Each section of slide table 944 may include a number of rollers 902. In one or more embodiments, the number of rollers 902 may be affixed to an upper surface of each section of slide table 944. In one or more embodiments, slide table 944 may be configured to slidably engage with one or more support members 946 (as shown in FIG. II) in order to slide away from the longitudinal axis that track 934 is disposed on. Slide table 944 may be manually pulled (or pushed when retracted) into position by an operator of trailer bed 920. In other embodiments, slide table 944 may be hydraulically controlled. In other embodiments, slide table 944 may be automatically positioned using mechanical/electrical systems known to those in the art.

FIGS. 11, 12, and 15 illustrate slide table 944 in an extended position. Further, FIGS. 11, 12, and 15 show that containment arms 930 may also be engaged in either a compressed or extended position when slide table 944 is in its extended position. Slide table 944 may provide a support for a coil of pipe (e.g. 102) or reel (e.g. 702) to bear against. The set of rollers 902 included on the upper surface of each section of slide table 944 may allow for the coiled pipe to rotate during deployment. Extending slide table 944 may allow for trailer bed 920 to accommodate coils of pipes or reels of larger sizes as well as provide a wider surface area against which the coil of pipe may rest against during deployment. In accordance with one or more embodiments, rollers 902 may be arranged both above and below the location of slide table 944. In other embodiments, rollers 902 may only be included on each section of slide table 944.

Turning to FIGS. 16-19, turntable 1602 may be disposed on a trailer bed 1620 in accordance with embodiments of the present disclosure. In one or more embodiments, turntable 1602 may include a rotatable platform on which a coil of pipe (e.g., coil of pipe 102 or reel 702 of pipe) may be positioned using any one of the positioning methods as described in the present disclosure. A lifting head 1618 is mounted to turntable 1602. As shown in FIGS. 16-19, lifting head 1618 includes an arm assembly (e.g. arms 1606, 1608, 1628, and 1630) that protrudes outwardly from the turntable 1602. Turntable 1602 may advantageously provide additional support for a coil of pipe after being loaded onto lifting head 1618. Additionally, turntable 1602 may provide rotational movement that assists when deploying, i.e. unspooling, a mounted coil of pipe.

Figure 16:
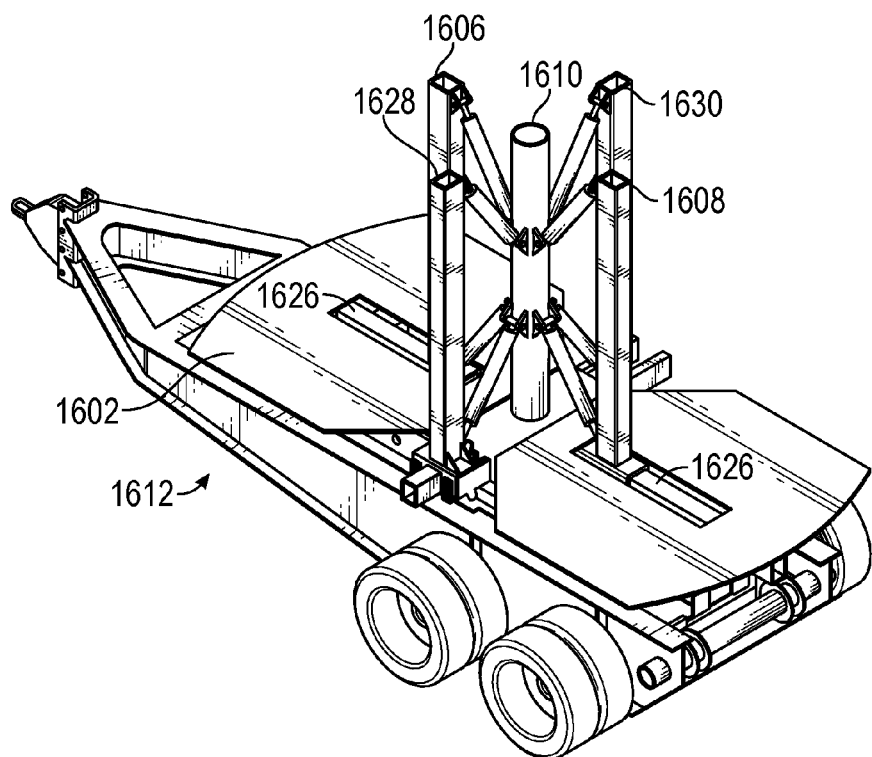
FIG. 16 is a diagram of trailer that includes a turntable according to embodiments of the present disclosure.
Figure 17:
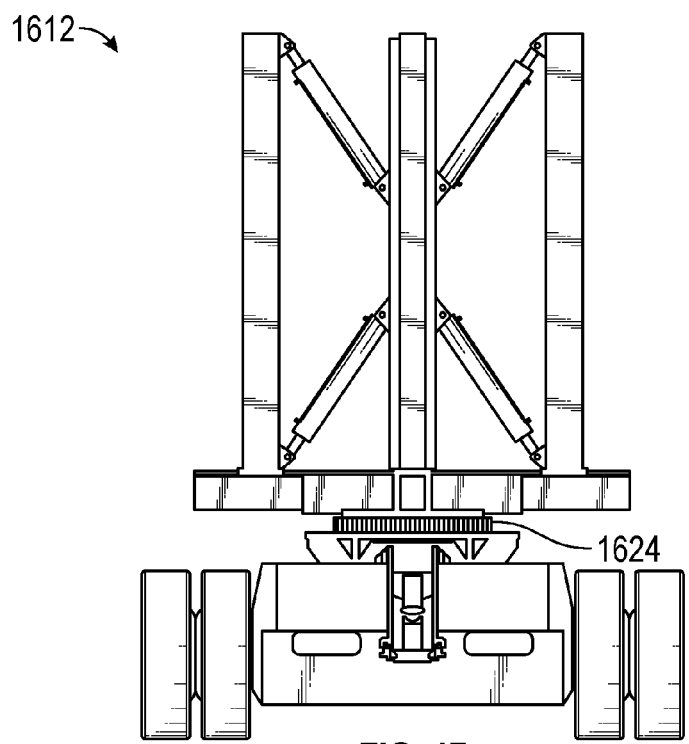
FIG. 17 is a diagram of a rear end view of the trailer in FIG. 16 that includes a turntable according to embodiments of the present disclosure.
Figure 18:
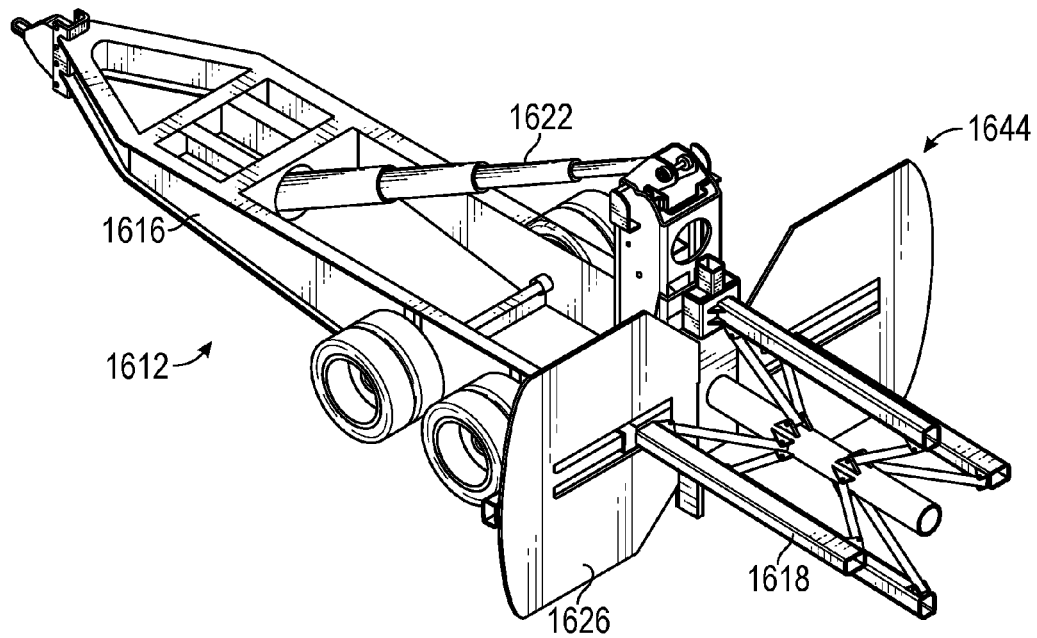
FIG. 18 is perspective view of the trailer in FIG. 16 that includes a turntable according to embodiments of the present disclosure.
Figure 19:
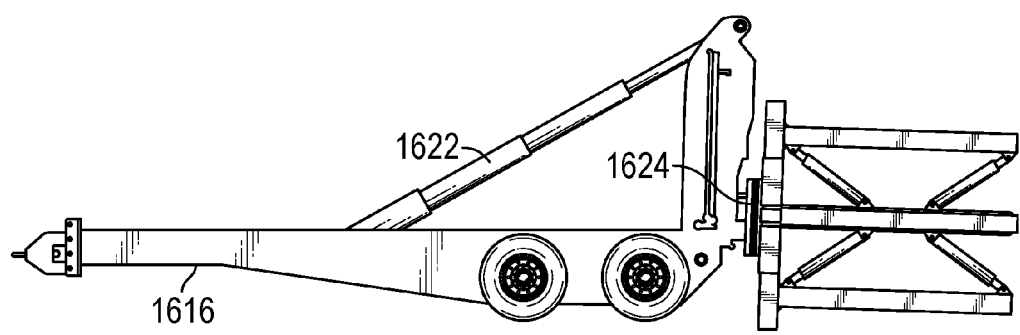
FIG. 19 is a side end view of the trailer in FIG. 16 with the trailer bed in a vertical orientation according to embodiments of the present disclosure.

FIGS. 16 and 17 illustrate trailer bed 1620 deployed in a horizontal orientation. FIGS. 18 and 19 illustrated trailer bed 1620 deployed in a vertical orientation and generally perpendicularly oriented to trailer base 1616. Similar to the discussion presented above regarding actuator 122, actuator 1622 may be configured to extend when trailer bed 1620 is in a vertical orientation and may be configured to retract so as to orient trailer bed 1620 in a horizontal orientation. Loading and unloading a coil of pipe or reel onto lifting head 1618 may be accomplished in accordance with any one of the embodiments discussed above with respect to lifting head 1618.

In one or more embodiments, turntable 1602 may include one or more sections. As shown in FIGS. 16 and 18, each section of turntable 1602 may include a track 1626 disposed along a longitudinal axis of turntable 1602 along which one or more arms of lifting head 1618 may move to increase or decrease a distance between arms 1606 and 1608. Accordingly, arms 1606 and 1608 are disposed on opposite sides of central shaft 1610, and arms 1606 and 1608 may be configured to be moved along track 1626 on each section of turntable 1002. Thus, lifting head 1618 may be adjusted to fit an inner diameter of various sized coils of pipe 102 (or reels). In addition, in one or more embodiments, arms 1628 and 1630 disposed on a transverse axis of turntable 1602 (located opposite sides of central shaft 1610) may also be configured to expand or retract as needed to adjust to the inner diameter of a coil of pipe 102.

Further, trailer bed 1620 may include a rotatable platform 1624 upon which each section of turntable 1602 may be disposed (as shown in FIGS. 17 and 19). Rotatable platform 1624 may enable turntable 1602 to rotate during deployment of a coil of pipe disposed upon turntable 1602. Thus, as shown in FIG. 19, when trailer bed 1620 is disposed in a vertical orientation, an unsecured end of a pipe on a coil of pipe (e.g. 102) may be pulled away from trailer 1612 so that the pipe disposed in a coil may be unwound and laid out for further use. In one or more embodiments, coil of pipe 102 may be deployed while trailer bed 1612 is in a horizontal orientation (as shown in FIG. 16).

Trailer 1612 may be operated as trailer 112 according to one or more embodiments discussed above. It is also understood by those of ordinary skill in the art that trailer 1612 may have different configurations than those shown in FIGS. 16-19. For example, the size of trailer 1612 and size of turntable 1604 may be configured as needed. Further, containment arms similar to containment arms 930 may be disposed on a surface of trailer bed 1620 in accordance with one or more embodiments.

Figure 20:
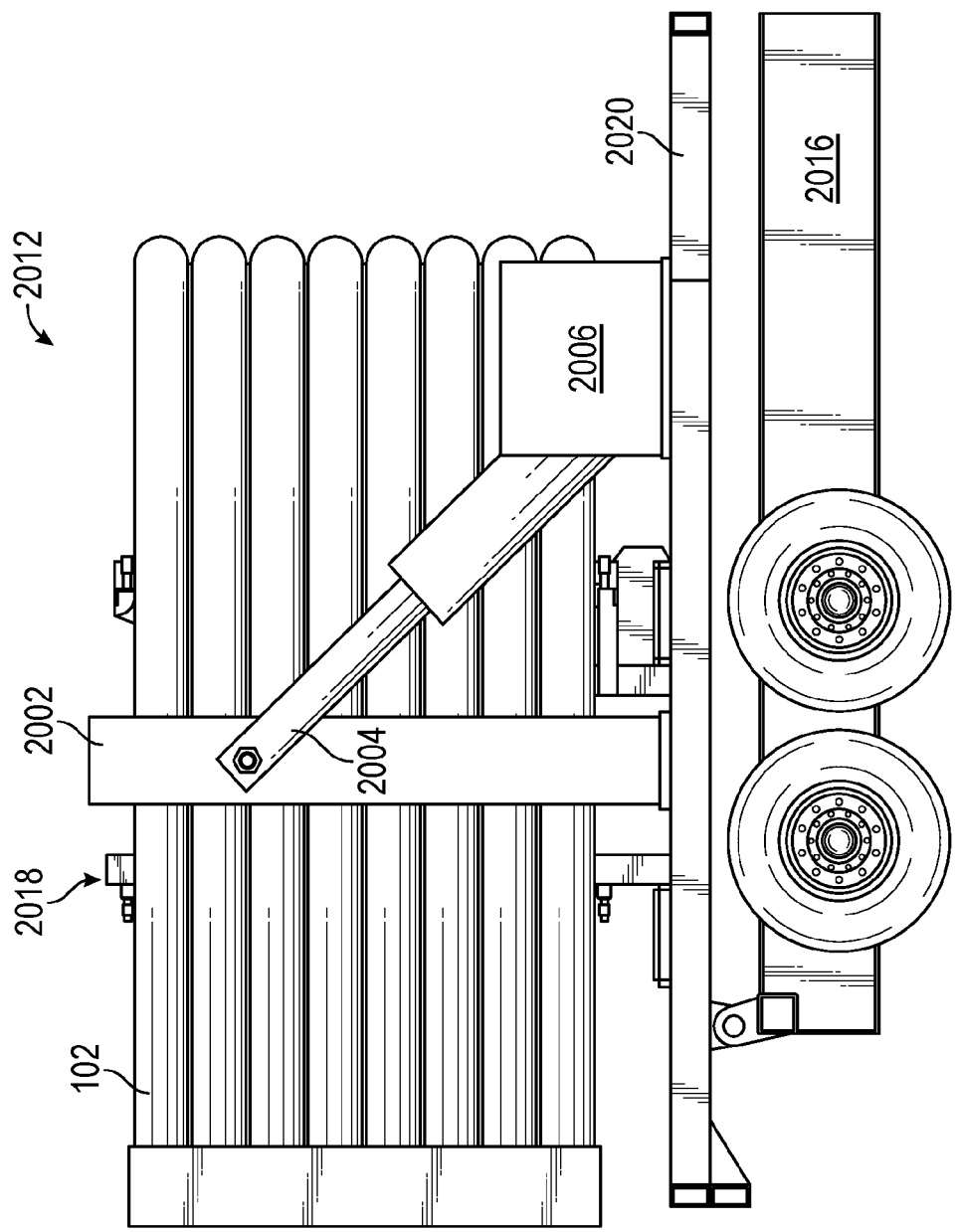
FIG. 20 is a side view of a trailer that includes a retention component according to embodiments of the present disclosure.

Turning to FIG. 20, FIG. 20 shows an embodiment that includes a retention component that provides tension to assist in keeping a coil of pipe in place and remain in the respective layers of coil of pipe (e.g., similar to stabilizers 942). As shown, trailer 2012 includes a trailer bed 2020 mounted to a trailer base 2016, a lifting head movably mounted to and protruding outwardly from the trailer bed 2020 (such that the lifting head 2018 may move along a track with respect to the trailer bed while also being retained to the trailer bed), and a retention component 2002 mounted to the trailer bed 2020. In other embodiments, a retention component may be mounted to a trailer base 2016. Retention component 2002 may act as an arm or support that may be positioned to one side of coil of pipe 102 as coil of pipe 102 is being deployed from the trailer 2012. Oftentimes, as pipe is unwound from a coil, being deployed, the layers of pipe may begin to unravel and the pipe does not unspool in a uniform or steady manner. Having a retention component, such as 2002, may allow for a force to be imparted to one side (along an outer diameter) of the coil of pipe 102 and prevent the coil of pipe 102 from unraveling too quickly, so that the overall structure of the coil of pipe 102 remains intact until each layer of pipe that make up the coil of pipe 102 has been pulled during deployment. It is noted that pipe may be deployed at many different sites which may not have on hand the necessary devices and additional equipment to easily respool or rewind pipe into a coil (e.g. at various oil and gas drilling sites). As such, retention member 2002 may be useful in holding coil of pipe 102 secure against trailer bed 2020.

An energizing mechanism 2004 is configured to apply a force to the retention member 2002, which in turn, may provide a force pushing against an outer diameter of a loaded coil of pipe 102. The energizing mechanism 2004 may be a hydraulic arm energized by pressurized hydraulic fluid, which may be contained within tank 2006. According to embodiments of the present disclosure, other energizing mechanisms may be used to energize energizing mechanism 2004 to apply a force to an outer diameter of a loaded coil of pipe, including without limitation, one or more springs, pneumatic energizing sources, or other mechanical or electrically energizing sources.

In one or more embodiments, the retention component 2002, energizing mechanism 2004 and/or tank 2006 may be detachably or permanently mounted on trailer bed 2020. For example, in one or more embodiments, retention component 2002, energizing mechanism 2004 and/or tank 2006 may be detachable from trailer bed 2020 and may be used only during deployment. In other embodiments, a retention component assembly (e.g., retention component 2002, energizing mechanism 2004 and/or tank 2006) may be permanently mounted to trailer bed 2020. Further, retention component 2002 and energizing mechanism 2004 may be configured to be stored in a retracted position (when not in use) on trailer 2012.

Pipe may be deployed from a coil of pipe or reel of pipe loaded onto a trailer according to embodiments of the present disclosure. A coil of pipe (or reel of pipe) loaded onto a lifting head of a trailer may be deployed while the lifting head is in a raised orientation (e.g., when one or more actuators is in an actuated state to raise the lifting head alone or to raise a trailer bed having a lifting head attached in a vertical orientation) or may be deployed while the lifting head is in a lowered orientation (e.g., when a lifting head is disposed along a trailer bed in a horizontal orientation). Pipe may be deployed from a coil of pipe (or reel of pipe) by unwinding the pipe from the coil of pipe (or reel of pipe) while the coil of pipe (or reel of pipe) is loaded on the lifting head.

According to some embodiments, deploying pipe from a coil of pipe (or reel of pipe) may include pulling an end of the pipe from the coil of pipe to unwind the coil of pipe. The trailer on which the coil of pipe is loaded may remain stationary while the end of the pipe is pulled. The coil of pipe may rotate about the lifting head on which it is loaded as the pipe is pulled from the coil. In some embodiments, a lifting head on which a coil of pipe is loaded may rotate the coil during unwinding the pipe from the coil. In some embodiments, deploying pipe from a coil of pipe (or reel of pipe) may include moving the trailer on which the coil of pipe is loaded away from an end of the pipe, whereby the coil of pipe may rotate during deploying to unwind the coil of pipe as the trailer moves away from the end of the pipe. The coil may rotate about the lifting head as the trailer moves away, or the lifting head may rotate the coil as the trailer moves away.

According to some embodiments, pipe may be deployed from a coil of pipe loaded onto a lifting head of a trailer by unwinding the pipe from the coil of pipe. A retention component may be engaged with an outer diameter of the coil of pipe during deploying, wherein an energizing mechanism applies a force to the retention component to engage the retention component with the outer diameter of the coil of pipe during deploying. When the retention component is engaged with and applying a force to the outer diameter of the coil of pipe, the retention component may support the outer diameter of the remaining coil (pipe that has not yet been unwound), thereby retaining or supporting the shape of the coil during deployment.

Further, in some embodiments, tension may be provided to a coil of pipe during deployment of pipe from the coil to control a speed of the unwinding. Tension mechanisms may include, for example, friction pads that may contact and create friction against the coil of pipe. Friction pads may be provided on, for example, containment arms, retention mechanisms, and/or the trailer bed (e.g., on a bed having a set of rollers disposed thereon). Friction pads may be selectively maneuvered or adjusted to provide a desired amount of friction to the coil as it rotates to unwind the pipe. Tension may be provided to a coil of pipe during deployment of the pipe, for example, to reduce the speed of the pipe being deployed and/or to stop deployment.

Those of ordinary skill in the art will appreciate that one or more pulling devices may be attached to one end of pipe to provide additional support to pull pipe any distance away from a trailer according to embodiments of the present disclosure in order to unwind the layers of pipe provided on coil of pipe. Further, in one or more embodiments, pipe from a coil of pipe may be attached to one or more tools known in the art to position the pipe downhole in a well. In addition, pipe from a coil of pipe may be pulled and laid in a horizontal manner on the ground for further use.

According to embodiments of the present disclosure, pipe may be spooled either into a coil of pipe or into a reel of pipe using trailers according to embodiments of the present disclosure. For example, in some embodiments, a trailer may be provided having a trailer base, a trailer bed mounted to the trailer base, a lifting head protruding in an outwardly direction from the trailer bed and the trailer base when the lifting head is in a first orientation, wherein a position of the lifting head is adjustable along a longitudinal axis of the trailer bed, and at least one actuator coupled to the trailer base for moving the lifting head to a second orientation. An end of pipe may be secured directly or indirectly to the lifting head of the trailer. The lifting head may then be rotated with the end of the pipe secured thereto to wind the pipe around the lifting head, thereby spooling the pipe into a coil (or around a reel in embodiments where a reel is disposed around the lifting head and the pipe is wound around the reel as the lifting head is rotated).

A motor may be disposed on the trailer in a position to rotate the lifting head, for example, at a base of the lifting head or on the trailer bed proximate to the lifting head. In some embodiments, a chain driven mechanism may be used to spool (or respool) pipe. For example, a hydraulic gear box with chain between the gears may be used to chain drive rotation of a lifting head, where the gears may rotate in a first direction to move the lifting head in a first rotational direction (e.g., to unwind pipe from a coil) and the gears may back rotate in a second opposite direction to move the lifting head in an opposite rotational direction (e.g., to wind pipe into a coil). In some embodiments, a motor may be used to rotate a platform on which a lifting head is disposed in a first rotational direction to deploy pipe from a coil of pipe and/or to rotate the platform on which the lifting head is disposed in an opposite rotational direction to spool or respool pipe into a coil.

Figure 21:
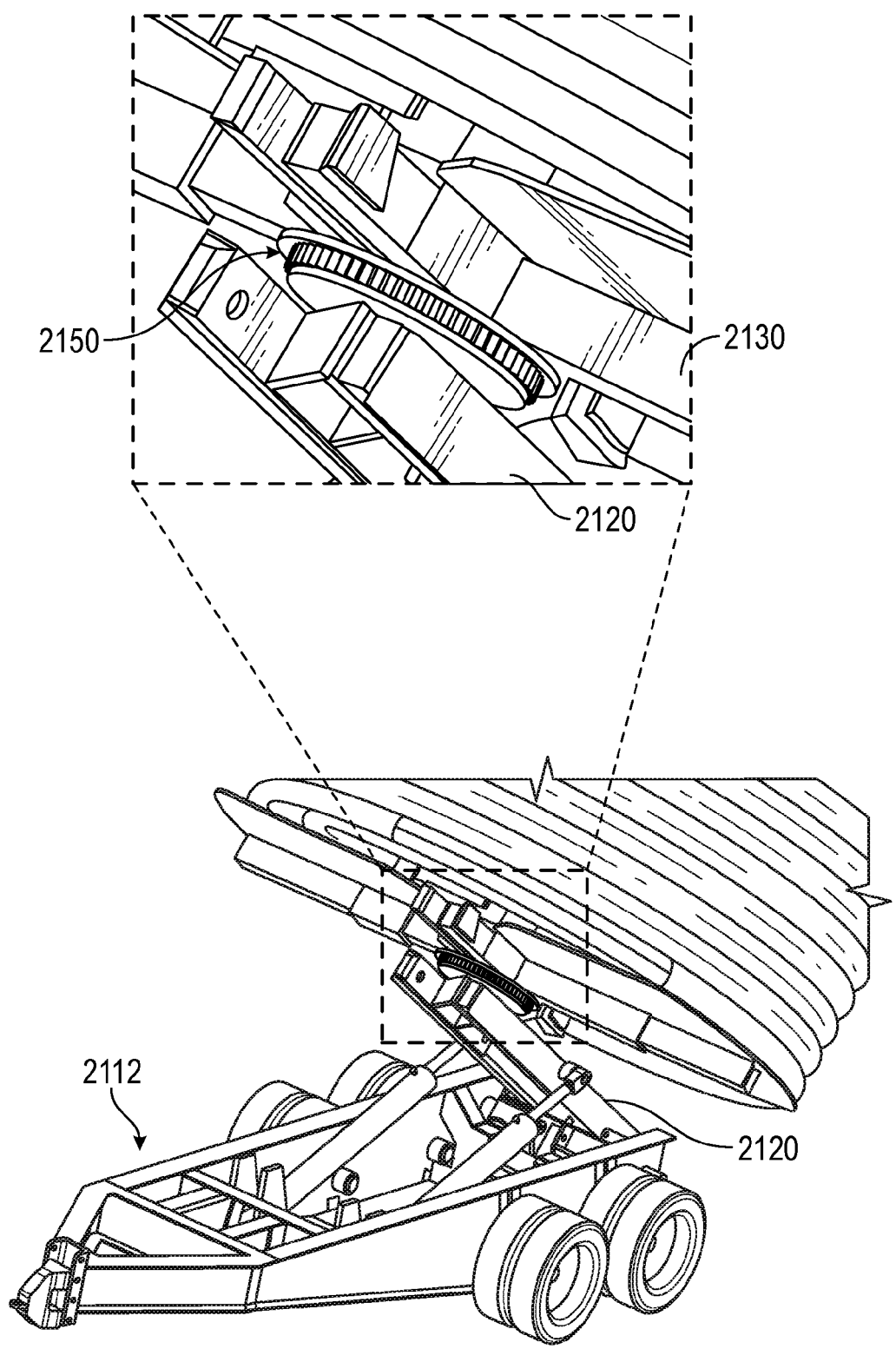
FIG. 21 shows a magnified view of a motor attached to a trailer according to embodiments of the present disclosure.

FIG. 21 shows an example of a trailer 2112 according to embodiments of the present disclosure having a motor 2150 disposed thereon, which may be used for spooling or respooling a pipe around the trailer lifting head. In the embodiment shown, the motor 2150 may be disposed between the trailer bed 2120 and a turntable 2130 supporting the trailer lifting head. The motor 2150 may rotate the turntable 2130 in either a clockwise or counterclockwise direction to spool or deploy pipe from around the lifting head protruding from the turntable 2130.

Figure 22:
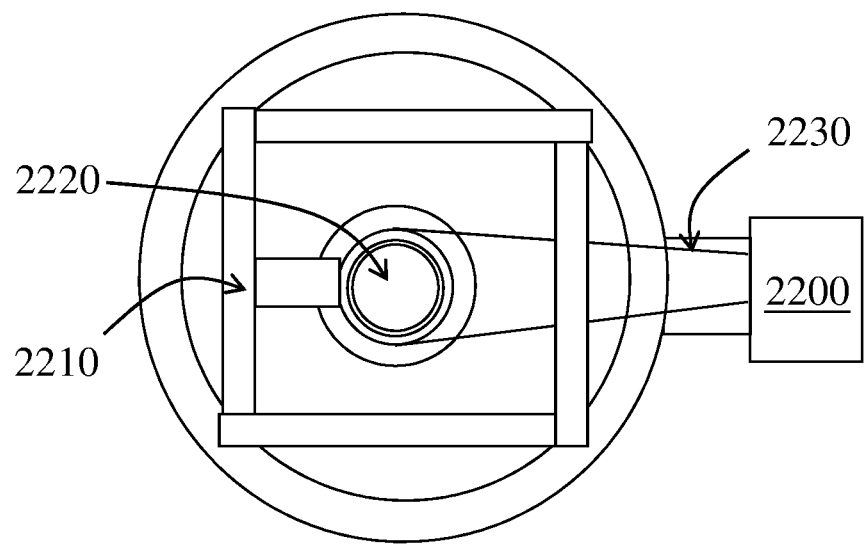
FIG. 22 shows a diagram of a motor mounted to a trailer according to embodiments of the present disclosure.
Figure 23:
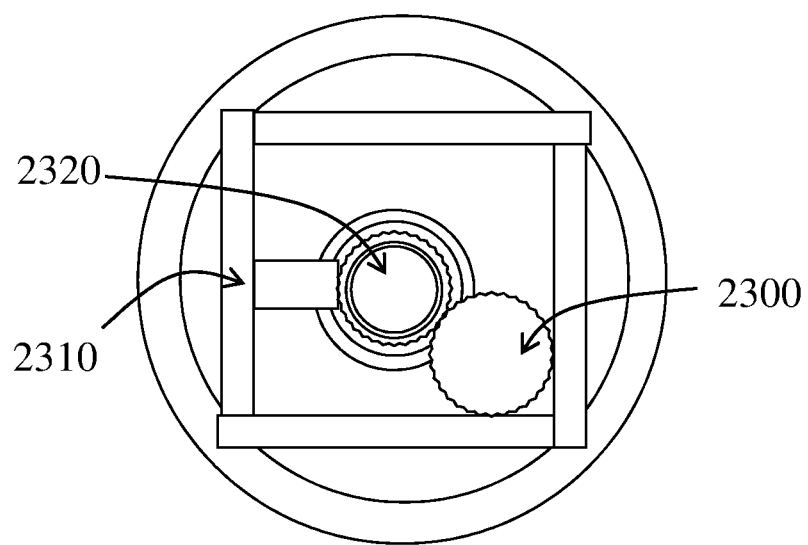
FIG. 23 shows a diagram of a motor mounted to a trailer according to embodiments of the present disclosure.

FIGS. 22 and 23 show examples of motors that may be used with trailers according to embodiments of the present disclosure. As shown in FIG. 22, a motor 2200 may be mounted to a platform or support structure 2210 that may be attached to and movable with respect to a trailer bed. For example, the support structure 2210 may be mounted to a track on a trailer bed, where the support structure may move along the track. A lifting head, such as described herein, may protrude from the support structure 2210 and be rotated by the motor 2200. As shown, the motor 2200 may drive a gear box 2220 using a chain 2230, where the gear box 2220 may rotate an attached lifting head. In some embodiments, motor 2200 may be a hydraulic motor to chain drive the rotation of a lifting head via the gear box 2220.

As shown in FIG. 22, a motor 2300 may be mounted to a platform or support structure 2310 that may be attached to and movable with respect to a trailer bed. A lifting head, such as described herein, may protrude from the support structure 2310 and be rotated by the motor 2300. As shown, the motor 2300 may drive a gear box 2320 directly, where the gear box 2320 may rotate an attached lifting head. In some embodiments, motor 2300 may be a hydraulic motor directly driving the rotation of a lifting head via the gear box 2320.

Respooling of the deployed pipe may be achieved using any of the embodiments discussed in the present disclosure. In other words, the deployed pipe may be rewound into a coil of pipe 102 around either lifting head 118 or shaft 802. Respooling, i.e. rewinding, deployed pipe into a coil may provide a more manageable way to maneuver and manipulate the coiled pipe for various uses and purposes. In one or more embodiments, the pipe that is to be respooled may be rewound into a coil 102 having one or more layers. Further, the pipe that is to be respooled may be rewound into a coil as disposed upon reel 702.

Numerous benefits and advantages may be provided as a result of the one or more embodiments described in the present disclosure. A trailer in accordance with one or more embodiments of the present disclosure may be self-loading, which means that the coil of pipe or reel of pipe (depending on what is provided) may be loaded to and positioned along the trailer with minimal additional support equipment and/or human labor. As described herein, a coil of pipe or reel of pipe may be positioned onto a protruding portion of a lifting head (e.g arm assembly or shaft), which may be coupled to a trailer bed that is configured to be automatically raised and lowered from a fully vertical to a horizontal orientation and vice versa. As such, a trailer according to embodiments described herein may be described as self-loading.

In addition, the trailer bed, as described in one or more embodiments herein, may be capable of automatically being raised or lowered to change the orientation of a coil of pipe. Such a trailer may eliminate the need to engage support equipment and supplies, such as without limitation, additional pallets, skids, baskets, and other external support features needed to load the coiled pipe in the horizontal, i.e., eye to the sky, orientation.

In addition, a trailer, as described herein, may be able to handle a larger weight capacity compared to existing trailers used to transport coiled pipe due to the additional support provided by an adjustable lifting head mounted to a trailer bed, and also because the trailer bed may be lowered back to a horizontal orientation during transportation of such a trailer, which allows for transportation of coils or reels of pipe having heavier weights and larger dimensions.

Further, a trailer as described in the present disclosure may be able to unload full or partial coil directly to the ground using a repositionable lifting head along a track as described above. Alternatively, a coil of pipe may be lowered onto any other type of trailer or other vehicle. Numerous other benefits and advantages are provided by a trailer in accordance with one or more embodiments of the present disclosure as will be understood by those of ordinary skill in the art.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method for spooling pipe, comprising:
providing a trailer, comprising:
a trailer base;
a trailer bed mounted to the trailer base;
a lifting head protruding in an outwardly direction from the trailer bed and the trailer base when the lifting head is in a first orientation, wherein a position of the lifting head is adjustable along a longitudinal axis of the trailer bed, and wherein the lifting head comprises two or more arm members and wherein the spatial distance between the two or more arm members can be adjusted to increase or reduce spacing therebetween;
a plurality of containment arms coupled to the trailer and adjustable towards or away from a central reference point thereon, and capable of providing structural support for the pipe; and at least one actuator coupled to the trailer base for moving the lifting head to a second orientation;
securing an end of the pipe to the lifting head;
contacting the pipe with the containment arms; and
rotating the lifting head to wind the pipe around the lifting head.

2. The method of claim 1, wherein a motor is disposed at a base of the lifting head, wherein the motor rotates the lifting head.

3. The method of claim 1, wherein each containment arm is affixed to an upright support member that is affixed to a surface of the trailer bed.

4. The method of claim 3, wherein each containment arm is adapted to move between an extended position that is closer to the lifting head and a retracted position that is further from the lifting head.

5. The method of claim 4, wherein each containment arm is adapted to pivot outwardly from the support member when extended and adapted to pivot inwardly towards the support member when retracted.

6. The method of claim 3, wherein each containment arm has a stabilizer disposed on a top edge thereof that is capable of contacting and providing tension against an outer surface of the pipe.

7. A method for spooling pipe, comprising:
providing a trailer, comprising:
a trailer base;
a trailer bed mounted to the trailer base;
a lifting head protruding in an outwardly direction from the trailer bed and the trailer base when the lifting head is in a first orientation, wherein a position of the lifting head is adjustable along a longitudinal axis of the trailer bed, and wherein the lifting head comprises three arm members that are arranged to form a substantially triangular shaped arm assembly; and
at least one actuator coupled to the trailer base for moving the lifting head to a second orientation;
securing an end of the pipe to the lifting head; and
rotating the lifting head to wind the pipe around the lifting head.

* * * * *